(12) United States Patent
Chou et al.

(10) Patent No.: US 7,760,728 B2
(45) Date of Patent: Jul. 20, 2010

(54) SYSTEM AND METHOD FOR EFFICIENT BROADCAST OF INFORMATION OVER A NETWORK

(75) Inventors: Philip A. Chou, Bellevue, WA (US); Yunnan Wu, Redmond, WA (US); Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 3 days.

(21) Appl. No.: 12/185,720

(22) Filed: Aug. 4, 2008

(65) Prior Publication Data
US 2008/0291834 A1  Nov. 27, 2008

Related U.S. Application Data

(62) Division of application No. 10/751,690, filed on Jan. 5, 2004, now Pat. No. 7,408,938.

(51) Int. Cl.
H04L 12/28 (2006.01)
H04L 12/56 (2006.01)
H04J 3/26 (2006.01)
H04J 3/24 (2006.01)

(52) U.S. Cl. .................. 370/390; 370/432; 370/473

(58) Field of Classification Search .................. 370/390, 370/432, 473
See application file for complete search history.

(56) References Cited

U.S. PATENT DOCUMENTS

| | | | |
|---|---|---|---|
| 5,631,907 A | 5/1997 | Guarneri et al. | |
| 5,822,317 A | 10/1998 | Shibata | |
| 6,609,223 B1 | 8/2003 | Wolfgang | |
| 6,778,531 B1 * | 8/2004 | Kodialam et al. | 370/390 |
| 6,826,564 B2 * | 11/2004 | Thompson et al. | 707/4 |
| 6,940,854 B1 | 9/2005 | Acharya et al. | |
| 7,414,978 B2 * | 8/2008 | Lun et al. | 370/238 |
| 2003/0063569 A1 | 4/2003 | Kalliokulju et al. | |
| 2003/0156599 A1 | 8/2003 | Casaccia et al. | |
| 2003/0179698 A1 | 9/2003 | Lu | |
| 2004/0213238 A1 | 10/2004 | Peled | |
| 2004/0246905 A1 | 12/2004 | Dunagan et al. | |

(Continued)

OTHER PUBLICATIONS

Ahlswede, Rudolf et al. "Network Information Flow" IEEE Transactions on Information Theory, vol. 46, No. 4, Jul. 2000, 14 pages.

(Continued)

Primary Examiner—Chi H Pham
Assistant Examiner—Farah Faroul
(74) Attorney, Agent, or Firm—Lee & Hayes, PLLC

(57) ABSTRACT

A system and method that can receive, buffer, and asynchronously combine data from various incoming data packets is disclosed. The system and method can do so by, first, receiving incoming packets of one or multiple generations that have incoming data and incoming metadata, with the incoming data of each of the incoming packets that are of a first generation being a combination of a first, original set of data vectors, and the incoming metadata of each of the first generation of incoming packets including an indicator for the first generation. Second, once these incoming packets are received, the system and method can buffer them based on the indicator and, asynchronously from the receiving and buffering, combine the incoming data in the buffered, first generation incoming packets into outgoing data in an outgoing packet.

17 Claims, 20 Drawing Sheets

U.S. PATENT DOCUMENTS

2005/0010675 A1* 1/2005 Jaggi et al. .................. 709/232
2005/0038909 A1* 2/2005 Yoshiba et al. .............. 709/241
2006/0007947 A1* 1/2006 Li et al. ...................... 370/432
2007/0133420 A1* 6/2007 Guven et al. ................ 370/238
2007/0147371 A1* 6/2007 Radha et al. ................ 370/390

OTHER PUBLICATIONS

Albanese, Andres et al., "Priority Encoding Transmission" IEEE Transaction on Information Theory, vol. 42, No. 6, Nov. 1996, 10 pages.

Davis, Geoffrey, et al. "Joint Source and Channel Coding for Image Transmission Over Lossy Packet Networks" Dartmouth College, 12 pages.

Dumitrescu, Sorina et al., "Globally Optimal Uneven Error-Protected Packetization of Scalable Code Streams" Universit of Western Ontario, London, ON, Deppt of computer Schience 6 pages.

Goldberg, Andrew V. et al., "A New Approach to the Maximum-Flow Problem" Journal for the Association for Computing Machinery, vol. 35, No. 4, Oct. 1988, 20 pages.

Jaggi, Sidharth, et al. Low complexity Algebraic Multicase Network Codes, ISIT 2003, Yokohama, Japan, Jun. 29-Jul. 4, 2003, 1 page.

Jaggi, Sidharth, et al. "Polynomial Time Algorithms for Multicast Network Code Construction" Jul. 18, 2003, 14 pages.

Karzanov, A.V., "Determining the Maximal flow in a Network by the Method of Preflows", Soviet Math. Dokl., vol. 15, No. 2, (1974), 4 pages.

Koetter, Ralf et al., "Beyond Routing: an Algebraic Approach to Network Coding" IEEE (2002) 10 pages.

Li, Shuo-Yen Robert et al., "Linear Network Coding" ISSS Transactions on Information Theory, vol. 49, No. 2, Feb. 2003, 12 pages.

Mohr, Alexander E. et al., "Unequal Loss Protection: Graceful Degradation of Image Quality over Packet Erasure Channels Through Forward Error Correction" IEEE Journal on Selected Areas in Communications, vol. 18., No. 6, Jun. 2000, 12 pages.

Puri, Rohit et al. "Multiple Description Source coding using Forward Error Correction Codes" University of California, Berkeley, Dept. of Electrical Engineering and Computer Science 5 pages.

Roxen Community: community.roxen.com, unknown title, Internet Engineering task Force, Oct. 31, 2003, 19 pages.

Sanders, Peter, et al. "Polynomial Time Algorithms for Newwork Information Flow" SPAA Jun. 2003, 9 pages.

Stockhammer, Thomas et al. "Progressive Texture Video Streaming for Lossy Packet Networks" Institute for Communications Engineering, Munich University of Technology, 12 pages.

Wu "Practical Network Coding" Jul. 29, 2003, 9 pages.

Chou, et al. "Practical Network Coding" Pub 2003, 10 pages.

* cited by examiner

PRIOR ART

Fig. 3
PRIOR ART
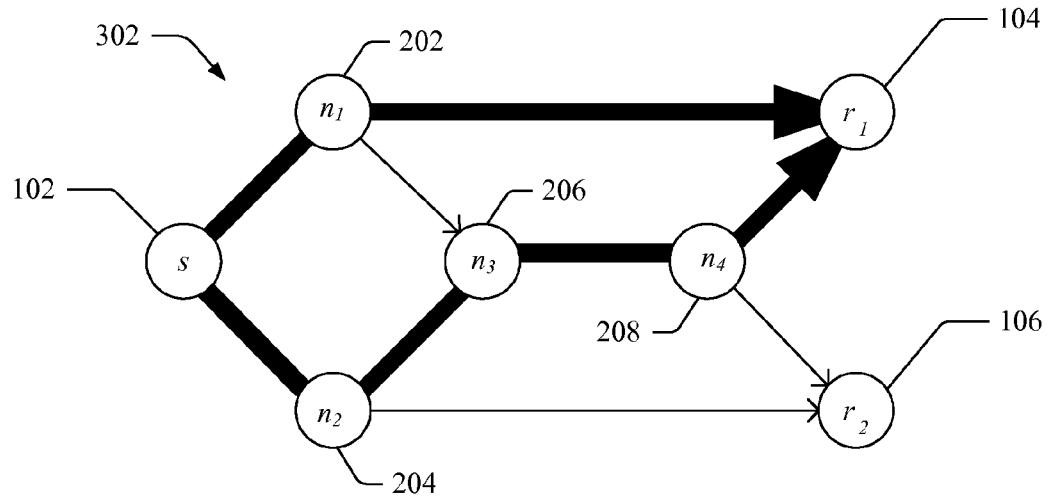
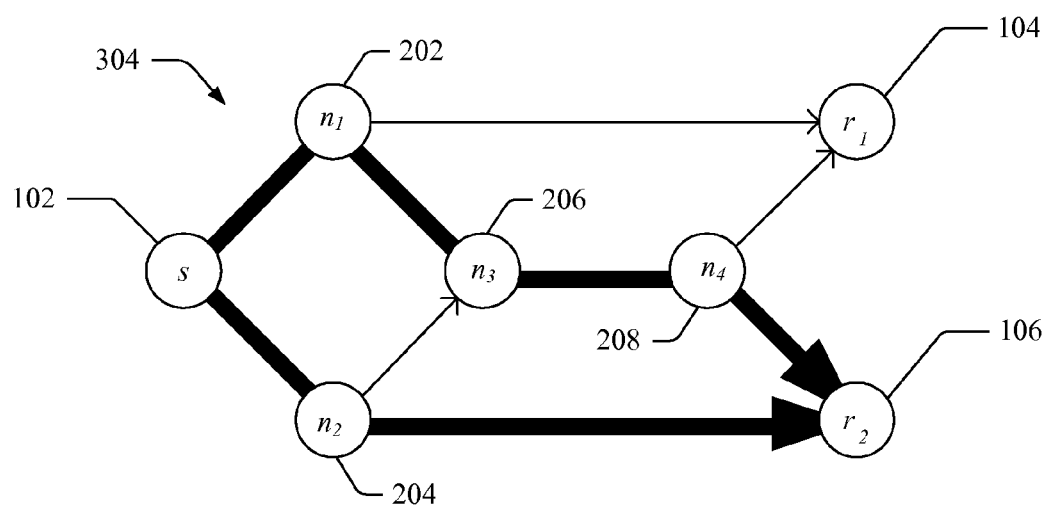
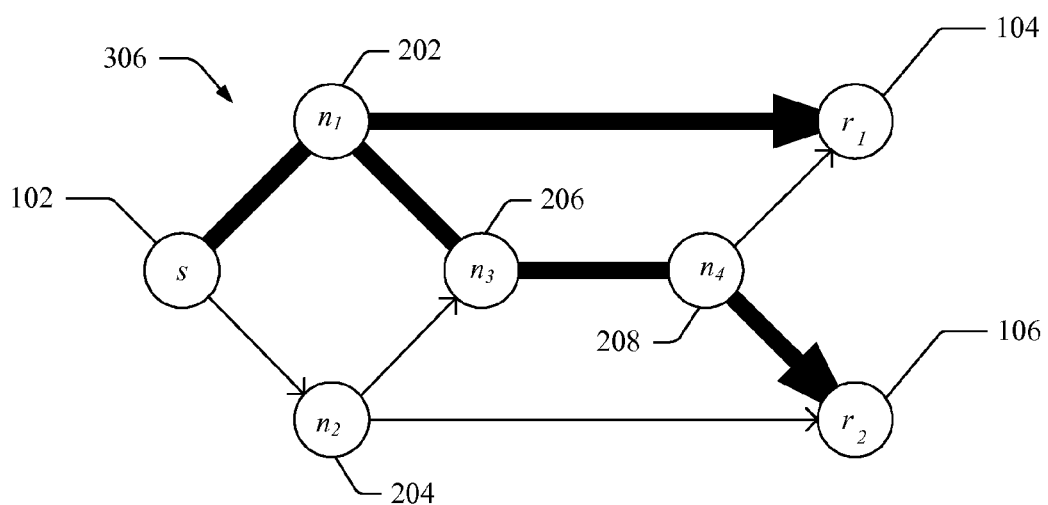

PRIOR ART

SYSTEM AND METHOD FOR EFFICIENT BROADCAST OF INFORMATION OVER A NETWORK

CROSS REFERENCE TO RELATED PATENT APPLICATION

This application is also a divisional application of U.S. patent application Ser. No. 10/751,690, which will issue as U.S. Pat. No. 7,408,938 on 5 Aug. 2008. The 10/751,690 application is a continuation-in-part of a United States patent application having Ser. No. 10/686,952, a filing date of Oct. 15, 2003, for SYSTEM AND METHOD FOR BROADCASTING INFORMATION OVER A NETWORK of Philip A. Chou et al, which issued as U.S. Pat. No. 7,349,440 ON 25 Mar. 2008. These United States patent applications are commonly assigned herewith and are hereby incorporated herein by reference.

TECHNICAL FIELD

This disclosure relates to efficiently broadcasting information over networks.

BACKGROUND

Data broadcast over a network involves sending data from one sender across a network to multiple receivers. In data broadcast all of the receivers should receive substantially the same data. An example of broadcasting, though not necessarily over a network, is television broadcasting. In television broadcasting one television station (a sender) broadcasts data to multiple people with televisions (each a receiver).

There are many networks over which a sender may broadcast data to multiple receivers. One network is a physical network, such as ISPs (Internet Service Providers) on the Internet. This type of physical network includes routers, wires, and other hardware. Other networks include overlay networks on top of a physical network. Here nodes of the network include people's computers, computer servers, other logic machines, or the like.

FIG. 1 sets forth a simple model of a sender sending data across a communication network to multiple receivers. FIG. 1 shows a sender 102 sending data to a first receiver 104, a second receiver 106, and a third receiver 108. The sender 102 sends the data across a communication network 110. For purpose of clarity the sender 102 and the receivers 104, 106, and 108 are shown outside of the communication network 110. Each of these, however, may be modeled as a node within the communication network 110, as will be shown below.

The communication network 110 includes nodes. These nodes may be routers, client computers, and server computers. These nodes route, send, and/or receive data.

FIG. 2 sets forth a simple model of the communication network 110 having four intermediate nodes and nine communication paths as well as nodes representing the sender 102, the first receiver 104, and the second receiver 106.

The four intermediate nodes include a first node 202, a second node 204, a third node 206, and a fourth node 208. The sender 102 may include or be co-located with an intermediate node, though for simplicity this is not shown. Also, the receivers 104 and 106 may include or be co-located with an intermediate node, also not shown for simplicity. The communication paths (which may be physical or otherwise) are paths of communication between the sender 102, the intermediate nodes, the first receiver 104, and/or the second receiver 106. These communication paths are also referred to as "edges".

There are two typical ways in which senders broadcast data over a network. One way is called unicast. In unicasting, a sender sends data to each receiver. The problem with unicasting is that you have to dedicate a different path (with all the applicable resources) to every receiver. Because of this, unicasting may require as many resources as are used sending data from one sender to one receiver for each of the multiple receivers. Thus, it uses a great deal of bandwidth, making it an expensive way to send data to multiple receivers.

The second, and better, way to broadcast data over networks is called multicast. Multicasting is a more common way to broadcast data. In multicasting, a distribution tree is set up to transmit data through a network from a source (the root of the tree) to receivers (at leaves of the tree). Each node in the distribution tree simply copies data from its inbound link to one or more outbound links. Multicast results in a single path of data from the source to each receiver. One problem with multicasting, however, is that it has a limited throughput to each receiver, as shown in FIG. 3.

FIG. 3 sets forth simple models of the communication network 110, similar to that shown in FIG. 2. Here again, there is the sender 102 (marked with an "s") and the first and second receivers 104 and 106 (marked with "$r_1$" and "$r_2$"). Each edge has a particular capacity for communicating data. In this example, each edge capacity equals a "unit", for simplicity. As shown in a first-receiver-only multicast model 302 and a second-receiver-only multicast model 304, the maximum throughput to each receiver (separately) is two units. The maximum throughput to the receiver 104 is two units and the maximum throughput to the second receiver 106 is also two units—but not if the sender 102 is sending data to both of the receivers 104 and 106.

As shown in a multicast model 306, the sender 102 may broadcast one unit of throughput to the receivers 104 and 106, using a combination of a top path in the model 302 (from the sender 102 to the first receiver 104 through just the first intermediate node 202) and a top path in the model 304 (from the sender 102 to the second receiver 106 through the intermediate nodes 202, 206, and 208). It would also be possible to use a combination of the top path in the model 302 with a bottom path in the model 304 (from the sender 102 to the second receiver 106 through just the second intermediate node 204), or a bottom path in the model 302 (from the sender 102 to the first receiver 104 through the intermediate nodes 204, 206, and 208) with the bottom path in the model 304, but not the bottom path in the model 302 and the top path in the model 304. However, the sender 102 cannot broadcast two units of throughput to the receivers 104 and 106. For the sender 102 to broadcast two units of throughput to receivers 104 and 106, it would have to use both paths in both of the models 302 and 304. Thus, the edge from the third node 206 to the fourth node 208 would have to have a capacity of two units. Edges, however, have a capacity of one unit, not two. Thus, the sender 102, with this model 306, cannot broadcast two units of throughput to the receivers 104 and 106.

At best, with multicasting, the sender 102 may broadcast one unit of throughput to both of the receivers 104 and 106, and one unit of additional throughput to either the receiver 104 or receiver 106, but not both.

Thus, with multicasting it is not possible to broadcast two units of throughput to both receivers 104 and 106 simultaneously, because the maxflow (i.e., maximum-throughput) paths to each receiver collide (e.g., at the edge between intermediate nodes 206 and 208).

For more data on this failure of multicasting, see Alswede, Cai, Li, and Yeung, "Network information flow," *IEEE Trans. Information Theory*, IT-46, pp. 1204-1216, July 2000.

Recently, performing operations (called "encoding" when performed and "decoding" when reversed) at nodes of a communication network has been discussed; it is called "network coding." With network coding, more data may be received by the receivers (called additional "throughput") compared to unicasting and multicasting. In network coding, encoding may be performed at potentially any node in the network as data traverses through the network. In unicast and multicast, the data is simply forwarded or replicated; it is not encoded at the intermediate nodes in the network. Network coding is not just an operation performed to add redundancies, such as sometimes done in unicast and multicast—it actually increases throughput.

Thus, this network coding solution may increase the maximum throughput over multicasting and unicasting.

For instance, suppose $C_i$ is the capacity, i.e., the maximum throughput, available to the receiver 104, as determined by the maxflow-mincut theorem. (For more data on this theorem, see L. R. Ford, Jr., and D. R. Fulkerson, *Flows in Networks*, Princeton University Press, 1962). Thus, $C_i=2$ for each receiver in the above example. Theoretically (see Alswede et al., supra), it is possible to broadcast to all receivers simultaneously a number of units of throughput equal to the minimum of the capacities to each receiver, that is, equal to the "broadcast capacity" $C=\min C_i$, using network coding.

To increase throughput over the conventional methods, network coding encodes data at some or all of the internal nodes in a communication network, as the following figure shows.

FIG. 4 sets forth a simple network-coding model 400 of the communication network 110, similar to those shown in FIGS. 2 and 3. Here again, there is the sender 102, the first and second receivers 104 and 106, and the intermediate nodes 202, 204, 206, and 208. In this figure, data a and b is broadcast to both receivers. The third node 206 of the communication network 110 encodes the received a and b by adding a and b over a finite field. (Various other linear combinations could also be used.) The third node 206 then propagates this data downstream. The receiver 104 recovers (i.e., "decodes") a and b from a and a+b by subtracting a from a+b. The receiver 106 recovers (i.e., "decodes") a and b from a+b and b, similarly by subtracting b from a+b. Thus, with network coding, the receivers 104 and 106 both may receive two units of data. Each of these pieces of data, b, a, and a+b, are referred to generically as "symbols."

Here the encoding functions performed at the internal nodes in the network as well as the decoding functions performed at the receivers may be, in general, linear functions of data over a finite field. This is sufficient, i.e., linear functions over a finite field are sufficient at the internal nodes and at the receivers for the broadcast capacity to be achieved. (For more data on this sufficiency, see Li and Yeung, "Linear network coding," *IEEE Trans. Information Theory*, IT-49, pp 371-381, February 2003). (A finite field is a number system with only a finite number of elements, with addition, subtraction, multiplication, and division well defined.)

Those skilled in the art of network coding have discussed the possibility of providing a way to design linear encoding functions at each internal node as well as linear decoding functions at each potential receiver. (For a discussion on this, see Koetter and Médard, "An algebraic approach to network coding," *Proc. INFOCOM,* 2002). Others have, furthermore, provided polynomial time algorithms to design the linear encoding and decoding functions. (For a discussion on this, see Jaggi, Jain, and Chou, "Low complexity optimal algebraic multicast codes," *IEEE Int'l Symp. on Information Theory*, Yokohama, June 2003; Sanders, Egner, and Tolhuizen, "Polynomial time algorithms for linear information flow, "*ACM Symp. on Parallelism in Algorithms and Architectures*, San Diego, June 2003; and Jaggi, Sanders, Chou, Effros, Egner, Jain, and Tolhuizen, "Polynomial time algorithms for network code construction," *IEEE Trans. Information Theory*, submitted for possible publication, 2003, currently found at: http://www.its.caltech.edu./~jaggi/pubs/index.html). They show that field size T suffices, where T is the number of receivers. (For a discussion on this, see Jaggi, Sanders, et al., supra). Others also show that linear encoding functions may be designed randomly, and that if the field size is at least $E/\delta$, where E is the number of edges and $\delta$ is any number greater than zero, then the encoding will be invertible at any given receiver with probability at least $1-\delta$. Furthermore, if the field size is at least $ET/\delta$, then the encoding will be invertible simultaneously at all receivers with probability at least $1-\delta$.

One problem with the current theoretical discussion on network coding is that it assumes global knowledge of the network's structure, or "topology." That is, the current discussion assumes that some entity knows about each node in the network and how they are connected. This discussion assumes this global knowledge of the network topology because it provides a way to address two problems: 1) computing the broadcast capacity (so that the source knows the data rate at which to send), and 2) designing the linear decoding functions (so that each decoder knows how to invert the linear encoding functions applied at the internal nodes).

The prior art discussions also usually assume that the encoding and decoding functions must somehow be distributed reliably to the interior nodes and to the receivers. Thus, each node is assumed to be known and then told what operation to perform on the data.

Reliable distribution of the encoding functions to the interior nodes, however, may be avoided if they are chosen randomly or otherwise independently. In that case, the local encoding vectors as well as the topology must be known at the receivers in order for the receivers to compute the linear decoding functions to invert the symbols into their original form (here a and b), or they must be known at some centralized location that may reliably distribute the computed decoding functions to the receivers. Another problem with not knowing a network's topology is that if it changes, or if the model of the topology is wrong, the receivers will not be able to decode all of the symbols received.

Prior attempts have been made to design encoding functions for a class of failure patterns so that capacity is not reduced below a certain amount. But then the decoders still need to know the failure pattern in order to compute and apply the proper linear decoding function. For this purpose, communicating the failure pattern to the decoders must be done reliably. This data grows with the number of failed links.

Prior art discussions also usually assume that the communication is synchronous throughout the network. That is, symbols arrive at, are processed in, and are sent out from every node synchronously, according to a network-wide heartbeat. In most of today's packet networks, however, this is infeasible. Nodes in a packet network operate asynchronously with each other. Furthermore, in most of today's packet networks, transmission capacities along each edge vary as competing communication processes begin and end, and the network becomes more or less congested. For the above reasons, symbols may not arrive at any node in a synchronous fashion, and hence may not be processed and sent out in a synchronous fashion.

SUMMARY

The following description and figures describe a system and method for receiving incoming packets of data and metadata, synchronizing the incoming packets based on the metadata, and linearly combining the data of each of the synchronized incoming packets into an outgoing packet.

The system and method may also create multiple packets of information, each having data and metadata, the data of each of the multiple packets capable of being linearly combined with the data from others of the multiple packets, indicating, within the metadata of each of the multiple packets, a difference between the data within each of the multiple packets, and sending, across a communications network, the multiple packets of information to multiple receivers.

Also, the system and method can receive a first number of packets, each packet including data comprising a different linear combination of a second number of parts of a set of information, wherein the first number is less than the second number and the different linear combination of at least one of the packets does not include at least one of the parts of the set of information, receive instructions usable to determine the different linear combinations in each of the packets, and determine, using the instructions, some of the parts of the set of information from the data of the packets.

Further, the system and method can receive, buffer, and asynchronously combine data from various incoming data packets. The system and method can do so by, first, receiving incoming packets of one or multiple generations that have incoming data and incoming metadata, with the incoming data of each of the incoming packets that are of a first generation being a linear combination of a first, original set of data vectors, and the incoming metadata of each of the first generation of incoming packets including an indicator for the first generation. Second, once these incoming packets are received, the system and method can buffer them based on the indicator and, asynchronously from the receiving and buffering, linearly combine the incoming data in the buffered, first generation incoming packets into outgoing data in an outgoing packet.

Further still, the system can include a node of a communication network capable of receiving packets of data and metadata (the data of each of the packets being a linear combination of an original set of data vectors) and performing a Gaussian elimination on the data of each of the packets as each of the packets is received. By doing so, the system can decode data in the data packets earlier than by waiting to receive all of the data packets of a particular generation.

Also, the system and method can determine a sub-network in a communication network between a single sender and multiple receivers and communicate across the communication network from the single sender to the multiple receivers over edges in the union of flows. This can aid the system and method to efficiently broadcast information from a single sender to multiple receivers.

The system and method can also preferentially send packets of linearly combined information through particular channels in a communication network. The system and method can do so by creating a first, original set of data vectors and a second, original set of data vectors, linearly combining data vectors from the first original set of data vectors into first data in a first outgoing packet, linearly combining data vectors from the second original set of data vectors into second data in a second outgoing packet, and sending the first outgoing packet through a first channel and the second outgoing packet through a second channel.

BRIEF DESCRIPTION OF THE DRAWINGS

FIG. 3 illustrates simple models of a communication network each having data sent along various paths from a sending node to one or more receiving nodes.

The same numbers are used throughout the disclosure and figures to reference like components and features.

DETAILED DESCRIPTION

The following disclosure describes a system and method that enables broadcasting of data in packets across a network using network coding. This system and method may allow a network to broadcast information in packets without general knowledge of the network's topology. This system and method may also enable a network to organize and synchronize packets and communicate them with a low probability of failure. Further, this system and method may receive, buffer, and asynchronously combine data from various incoming data packets. Also, this system and method may decode data in data packets early by performing a Gaussian elimination on data packets. Further, the system and method may efficiently broadcast information from a single sender to multiple receivers by finding and following an efficient union of flows. The system and method may also preferentially send packets of linearly combined information through particular channels in a communication network.

Exemplary Method for Broadcasting Information Over a Network

Figure 5:
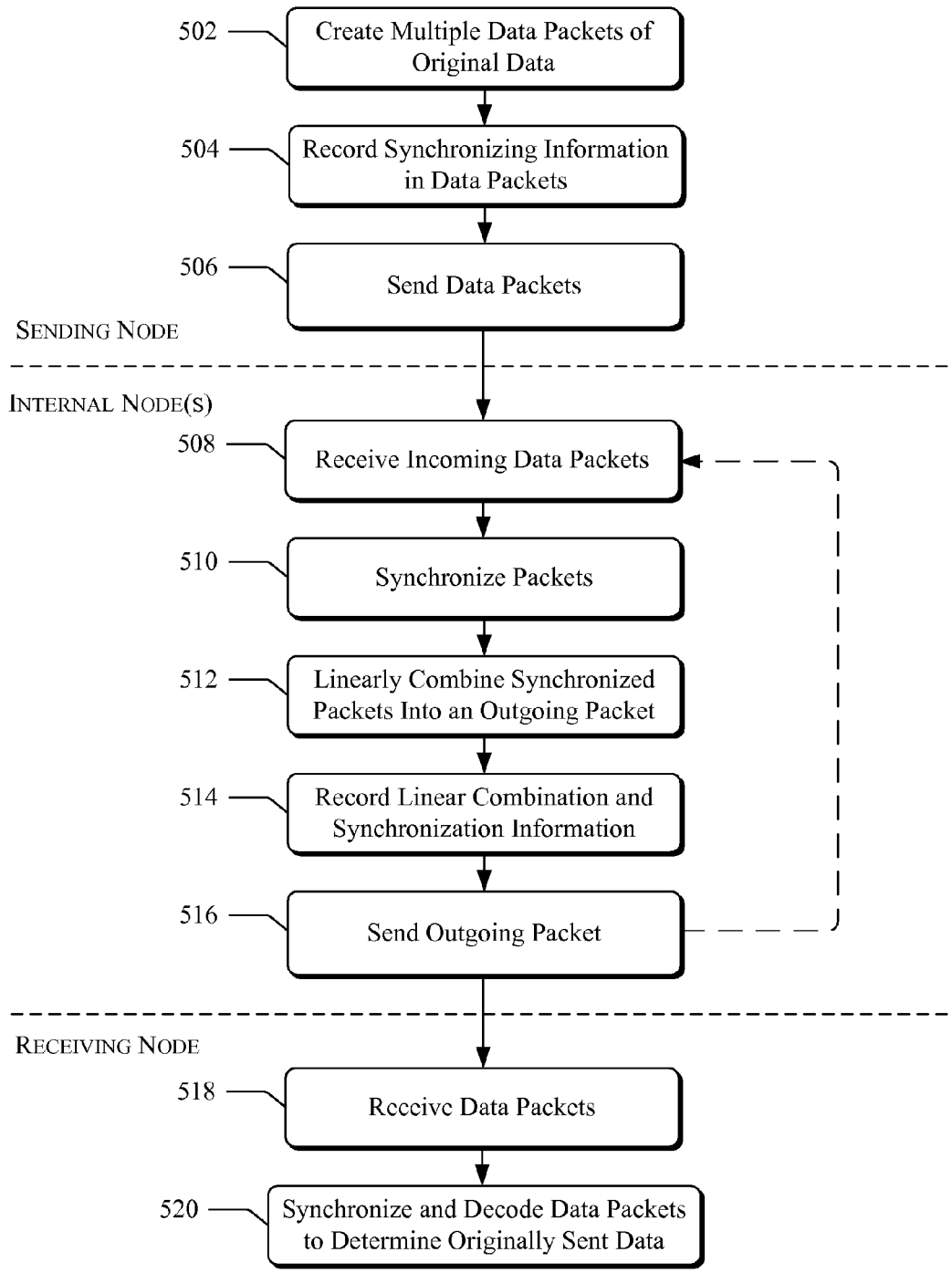
FIG. 5 is a flow diagram of an exemplary process for broadcasting data across a communication network using network coding.

FIG. 5 shows an exemplary process 500 for broadcasting information over a network. This and the following processes are illustrated as a series of blocks representing individual operations or acts performed by nodes of a communication network. These processes may be implemented in any suitable hardware, software, firmware, or combination thereof. In the case of software and firmware, the processes (or blocks thereof) represent a set of operations implemented as computer-executable instructions stored in memory and executable by one or more processors.

Figure 4:
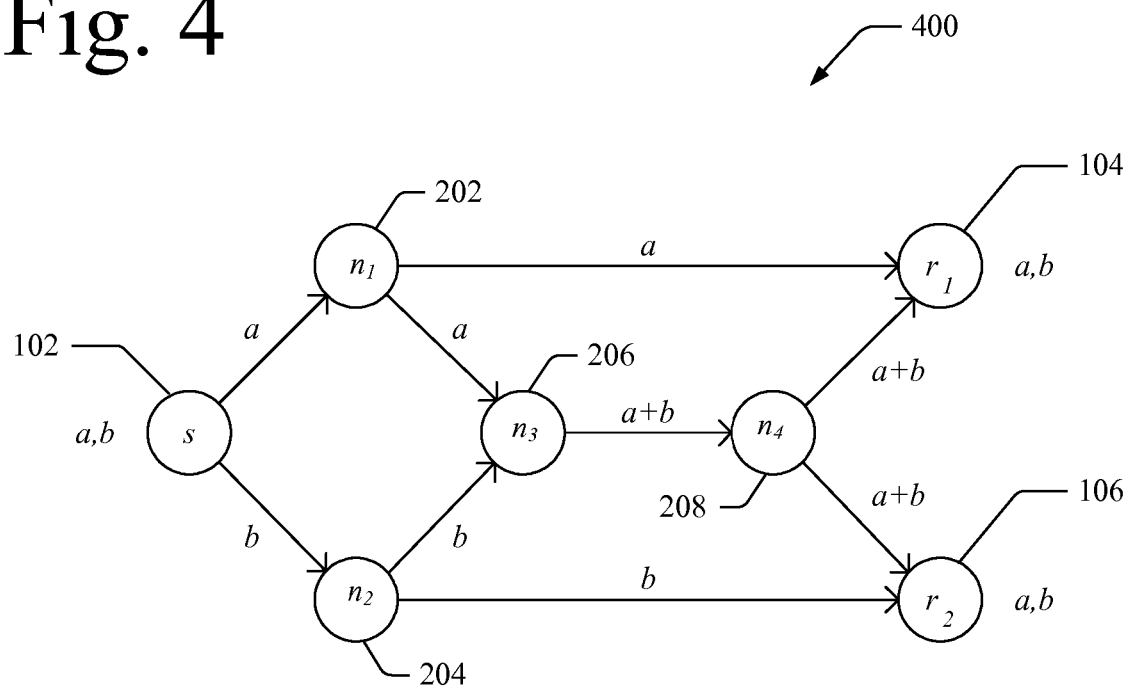
FIG. 4 illustrates a simple model of a communication network showing network coding.

For the purpose of discussion, the simple network-coding model 400 of the communication network 110 (as shown in FIG. 4), including its nodes and edges, are used to describe the process 500. This model 400 and the communication network 110 are not intended to limit the applicability of the process 500; other models and other communication networks may be used to implement the process 500 without departing from the spirit and scope of the present invention.

At block 502, the sender 102 creates multiple data packets. The sender 102 creates these data packets to contain data that the sender 102 intends to broadcast to multiple receivers, such as the receivers 104 and 106 of FIG. 4. This data originally sent by the sender 102 is the data that the sender 102 wants the receivers 104 and 106 to gain. This original data is also called a "set of data" or an "original set of data".

At block 504, the sender 102 adds metadata containing synchronization information to the multiple data packets. This synchronization information is used to maintain and infer the temporal relationships or other associations between packets of original data and packets of coded data, as discussed below. Such synchronization information could include, but is not limited to, time stamps, time slot identifiers, generation numbers, block numbers, sequence numbers, group names, group addresses, port numbers, etc. In one implementation, a time slot or generation number is used as the synchronization information in each packet, where every packet in the same generation has the same generation number and the generation numbers increase over time.

This synchronization information is one type of information that may be included in the metadata that may be within a data packet. Other types of information may also be included in the metadata, such as coefficients indicating the linear combination of the original set of data that is present in the packet, as described later.

Figure 6:
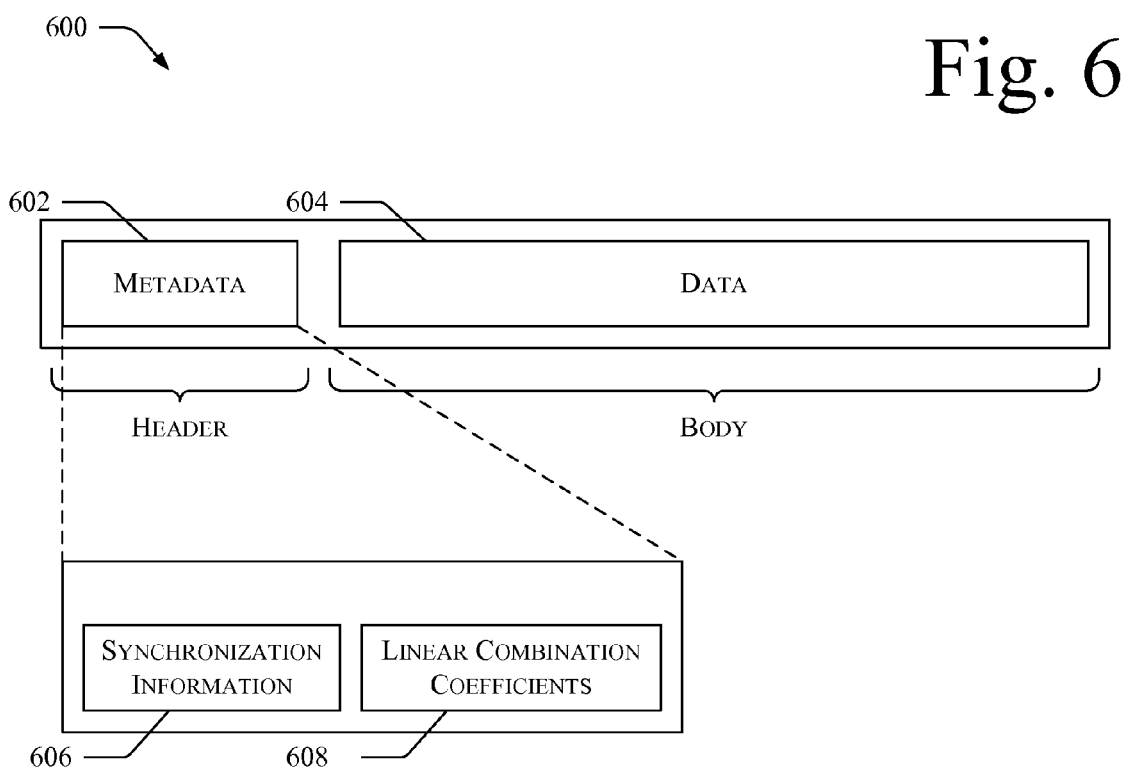
FIG. 6 illustrates a simple model of a data packet containing metadata and data.

FIG. 6 shows an exemplary data packet 600 containing the metadata 602 and data 604. In this implementation, the data 604 is that part of the packet 600 that is linearly combined with other data from another packet, the general process of which will be described below. The metadata 602 travels with the data 604 and may be used to identify the data 604. The metadata 602 may include various information, such as synchronization information 606 and linear combination coefficients 608, discussed below.

The data packet 600 of FIG. 6 is provided as an example to aid in discussion and is not intended to limit where in a data packet metadata and data are stored. In this example packet 600, the metadata 602 is stored in the header and data 604 is stored in the body. In practice, however, metadata and data may be stored in many different parts of and locations in a data packet, whether singly or in combination.

The metadata 602 contains, in this implementation, the synchronization information 606 indicating the synchronization between the data 604 and data of other packets created at block 502. The metadata 602 also contains, in this implementation, the coefficients 608 indicating the linear combination of an original set of data present in the data 604. This exemplary data packet 600 is used to aid in the description of the process 500.

The synchronization information 606 indicates the temporal relationships or other associations between the data 604 and data of other packets created at block 502, such as by each of the packets created at block 502 and each of the packets related to them having a same time slot or generation number. By so doing, a node may determine which packets related to the packets created at block 502 arrive late, out of order, or not at all. The synchronization information 606 may then be used by a node of the communication network 110 to reorder and resynchronize the packets arriving at the node.

The linear combination coefficients 608 represent a linear combination performed on an original set of data to obtain the data 604. Thus, they indicate the linear combination of the original set of data present in the data 604.

At block 506, the sender 102 sends the multiple data packets to nodes in the network 110.

At block 508, an internal node of the communication network 110 directly or indirectly receives the packets sent by the sender 102. The internal node may receive data packets directly from the sender 102 or from other, internal nodes that received the packets directly or indirectly from the sender 102. The internal node (such as the third node 206 of FIG. 4) receives the packets along edges from other nodes of the communication network 110 (including from the source node 102).

In one implementation, blocks 506 and 508 may be merged or eliminated if the sender 102 and an internal node are co-located. In this implementation, these blocks are not necessary because the packets do not need to be transmitted by the sender 102 in that case.

At block 510, the node synchronizes the received packets by determining the temporal relationships or other associations between the received packets and the packets of original data. This may be done using the synchronization information included in the metadata in the packets. In the ongoing example, this metadata 602 may be read from the headers of the data packets, such as the header of the packet 600. There may be various types of synchronization information indicating temporal relationships or other associations between the received packets and the packets of original data. One type of synchronization information identifies each received packet as belonging to a certain group of packets established by the packets of original data. These groups may be organized by a generation number or by a block of time in which the packets of the original data were sent (such as a time slot). In this case, the synchronization information indicates a temporal relationship. Alternatively, such groups may be organized by a name (e.g., represented by a character string) such as the name or address of the intended recipients of the original data (e.g., a group of receivers) or a description of the original data or of its origin or of its intended use. In this case, the synchronization information does not indicate a temporal relationship but rather some other association between the received packets and the packets of original data. Another type of synchronization information identifies each received packet as residing at a certain point within a moving interval of time or within a sliding window of packets. The interval or window may be specified by an initial time stamp or by a sequence number of a packet of original data, possibly followed by a duration or length. For example, such synchronization information could specify that a received packet contains information related to original packets beginning at sequence number $N_1$ and ending at sequence number $N_2$. Note, however, that the synchronization information discussed herein is different from ordinary packet sequence numbers. Whereas ordinary packet sequence numbers express a temporal relationship with other packets originating from the same location, the synchronization information discussed herein expresses a temporal relationship (or other association) between a packet and another set of packets not generally originating from the same location. Other types of synchronization information are also possible, as will be evident to those skilled in the art. The examples above are not intended to be exhaustive or exclusive.

The metadata 602, including synchronization information or ordinary sequence numbers, may also be used by the internal node to determine data packets that are missing. For example, after a node allows sufficient time to collect all the packets entering the node for a particular time slot, the outstanding packets in the time slot may be declared lost. This information may be used as part of block 512, discussed below.

mately 700 symbols in each packet transmitted along an edge, R symbols may be dedicated to a prefix vector. The remaining N symbols may be dedicated to the N-dimensional vector of code symbols that travel along the edge in a time slot. Thus, in addition to a header containing possible RTP/UDP/IP information as well as the synchronization information 606, each packet contains a body consisting of a vector of R+N symbols. R is chosen to be less than or equal to the capacity of the network, i.e., the minimum number of edges in any path between the source and a receiver. The transmission rate of R represents the number of packets transmitted by the source node in a time slot, as well as the maximum number of packets (after any losses) entering any receiver in a time slot. A reasonable number for R is 32.

Using symbols for purposes of discussion, after an internal node of the communication network 110 receives symbols for each of its incoming edges, it may produce a symbol for each of its outgoing edges by applying linear combinations to the symbols on its incoming edges, as shown in the figure below. Here, $e'_1$, $e'_2$, and $e'_3$ are incoming edges of a node, $e_1$ and $e_2$ are outgoing edges of the node, $Y(e'_1)$, $Y(e'_2)$, $Y(e'_3)$, $Y(e_1)$, and $Y(e_2)$ are symbols from a finite field along the edges, and the $\beta$'s (which are symbols from the same finite field) are the coefficients of the linear combinations performed at the node, where $\beta_i(e_j)$ is the multiple of $Y(e'_i)$ that contributes to $Y(e_j)$. Arithmetic operations to linearly combine the data are carried out in the finite field.

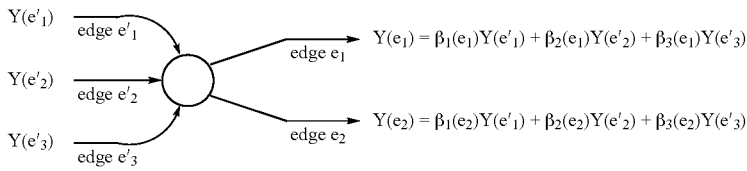

This may be repeated for each subsequent symbol, as illustrated in the following figure. Here, the subscripts $1, \ldots, N$ of the Y's index the subsequent symbols.

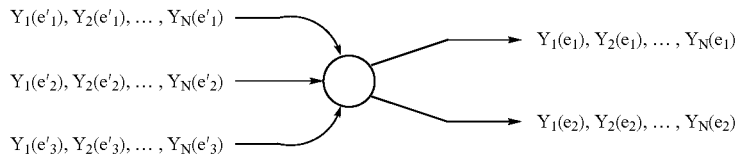

At block 512, the node linearly combines the data in the synchronized incoming packets into data in an outgoing packet. The node may also linearly combine portions of the metadata in the incoming packets. In one implementation, the node linearly combines both the data within the packets (such as the data 604 of the packet 600) as well as linearly combines a portion of the metadata within the packets (such as the coefficients 608 of the packet 600).

Data flowing on the edges of a communication network (such as the communication network 110) may be represented mathematically as symbols from a finite field. Symbols may be a bit, a byte, a 16-bit word, or a 32-bit word. If a symbol is a 16-bit word, then a packet payload of about 1400 bytes may contain about 700 symbols. Of these approxi- In one implementation of the process 500, the symbols on a network edge are grouped into time slots or generations of N symbols per time slot (such as using the synchronization information 606), and the symbols on an edge in each time slot are transmitted in a single, outgoing packet. Thus, each packet contains an N-dimensional vector of symbols for a given time slot, and in each time slot, each internal node produces a vector on each of its outgoing edges by applying a linear combination to the packets on its incoming edges, as illustrated in the following figure. (Here, the $\beta$'s are again the linear combination coefficients in the chosen finite field, and the Y's are N-dimensional vectors of symbols in the finite field. Operations are carried out in the N-dimensional vector space over this field.)

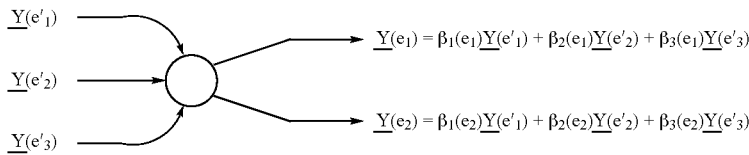

This may be repeated for subsequent packets, as illustrated in the following figure. The subscripts on the packets (i.e., on the vectors) identify the time slots in which the packets are produced.

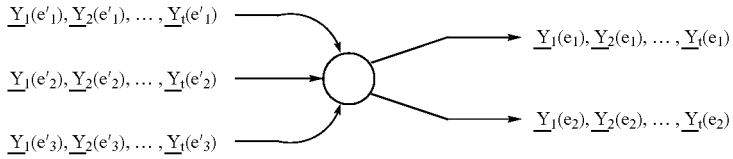

Thus, in each time slot the internal node produces an outgoing vector on each outgoing edge. The outgoing vectors constitute the data 604 in each outgoing packet 600. In this way, block 512 linearly combines the data in the synchronized packets into data in an outgoing packet.

Note that since the data vector in each outgoing packet is a linear combination of the data vectors in incoming packets, and the data vector in each incoming packet is a linear combination of the original set of data vectors issued by the sender, then by linearity the data vector in each outgoing packet is a linear combination of the original set of data vectors issued by the sender. Thus, if there are R vectors $X_1, \ldots, X_R$ in the original set of data, then each output vector $Y(e)$ may be expressed as a linear combination $Y(e) = w_1 X_1 + \ldots + w_R X_R$ of the original set of data vectors, where $w_1, \ldots, w_R$ are the coefficients of the linear combination, and each coefficient is a symbol in the chosen finite field.

At block 514, the internal node records the linear combination performed at block 512. The internal node records the coefficients $w_1, \ldots, w_R$ representing the linear combination of the original set of data vectors that is present within the outgoing packet. In addition, the internal node records synchronization information (such as a timestamp or sequence/generation identifier) for the outgoing packet. In one implementation, the synchronization information 606 and the linear combination coefficients 608 are included in the metadata 602 in the outgoing packet 600. The outgoing packet may later be received by another internal node for combination with other packets received and synchronized, and so forth until the packets are received by the first or second receivers 104 or 106.

If a receiver knows the linear combination coefficients for each of R packets that it receives, that is, if it knows the linear combination coefficients $w_{i,1}, \ldots, w_{i,R}$ for the received packet containing data vector $Y(e_i)$, $i=1, \ldots, R$, then it may decode the R received data vectors $Y(e_1), \ldots, Y(e_R)$ to obtain the original data vectors $X_1, \ldots, X_R$ by inverting the matrix of coefficients $W_{R \times R} = [w_{i,j}]$:

$$\begin{bmatrix} Y(e_1) \\ \vdots \\ Y(e_R) \end{bmatrix} = \begin{bmatrix} w_{1,1} & \ldots & w_{1,R} \\ \vdots & \ddots & \vdots \\ w_{R,1} & \ldots & w_{R,R} \end{bmatrix} \begin{bmatrix} X_1 \\ \vdots \\ X_R \end{bmatrix} = W_{R \times R} \begin{bmatrix} X_1 \\ \vdots \\ X_R \end{bmatrix}$$

For this reason, the record of linear combination coefficients (another type of metadata) may be sent, directly or indirectly, to the receiver.

As noted above, in one implementation, the synchronization information 606 and the linear combination coefficients 608 are included directly in the metadata 602 in each outgoing packet 600. This allows receivers to decode the data in the received packets into the originally sent data without any other knowledge of the network topology, the encoding functions performed at each interior node, the capacity of the network, or any link, node, or packet failure pattern. Thus, with the metadata recording the synchronization information and the linear operations performed, the receiver may synchronize and decode packets into data that was originally sent.

Since, in this implementation, the receiver does not need to know about the encoding functions at the internal nodes, the internal nodes may randomly encode (perform a random linear combination on) the synchronized packets. In some implementations, internal nodes may encode randomly as often as once every outgoing packet generated, independently of other nodes.

Also, internal nodes of the communication network 110 do not need to know the global network topology. With knowledge of local topology (i.e., upstream and downstream neighbors), rather than full global knowledge, internal nodes may linearly combine packets.

In this implementation, the information contained in the data packets is sufficient—no other information is required to be distributed to or from any internal node, either a priori at the time the internal node joins the network, or during operation, except possibly to establish and maintain knowledge of its neighbors. This greatly enhances network manageability, especially in ad hoc networks (where nodes come and go without any central authority), and greatly reduces communication costs. In particular, it provides a way to deal with packet losses while obviating the need for extra mechanisms or communications that may be problematic.

The discussion now returns to the previous example referencing data within packets as symbols.

Figure 7:
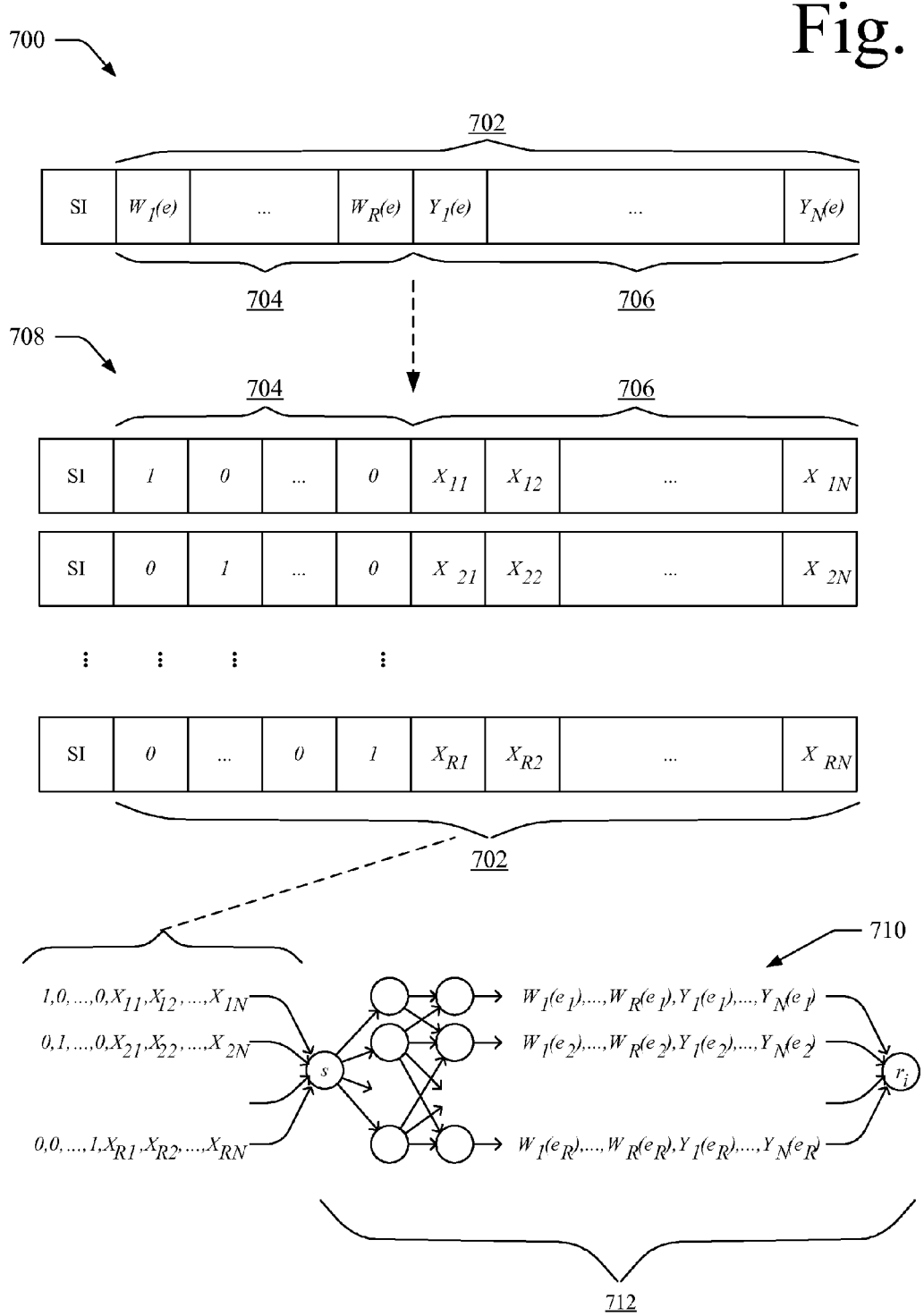
FIG. 7 illustrates models of synchronized data packets having a prefix and code symbols and showing a mathematical representation of resulting data packets after linear combinations are performed.

FIG. 7 depicts a packet 700 having synchronization information (SI) as well as an exemplary vector format with a vector 702 for a packet transmitted along an original network edge e. This vector 702 includes a prefix vector 704 and a data vector 706 of symbols. The prefix vector 704 represents the coefficients of the linear combination of the original set of data vectors present in the data vector 706. Thus, the synchronization information as well as the prefix vector are included in the metadata 602, while the data vector 706 is the data 604. This is therefore a case in which some metadata (namely the prefix vector 704) may be located in the packet body.

In this implementation, the internal nodes in the network 110 do not recognize the division of the vector 702 between the prefix vector 704 and data vector 706. So while the prefix vector 704 includes metadata about the data vector 706, the prefix vector 704 is not separate from the data vector 706. Thus, the internal nodes produce linear combinations of the vectors 702 in various packets as they would data above. Thus, the internal nodes (such as the third node 206) linearly combine all of the vectors 702 (which includes both data and metadata) in various packets. So the internal nodes also linearly combine some metadata (the prefix vector 704) about the data (the data vector 706). At the source 102, however, the R source packets that are to be encoded and transmitted by the source 102 have their vector prefixes set equal to the R different R-dimensional unit vectors, rather than a linear combination of vectors.

FIG. 7 also sets forth originally sent packets 708 that are examples of the packet 700 and the vector 702.

Linear combinations of the originally sent packets 708 are produced on the output edges of communication network 110 nodes; they are linear combinations of the originally sent packets 708 on the input edges of the nodes. Because of this, the packets that arrive on the input edges of each receiver are linear combinations of the R number of originally sent packets 708. FIG. 7 additionally sets forth linearly combined packets 710 and an example of part of the communication network 110 (referenced at 712). These combined packets 710 are linear combinations of the originally sent packets 708.

If a packet containing the vector $[W_1(e), \ldots, W_R(e), Y_1(e), \ldots, Y_N(e)]$ arrives on the input edge e of some receiver, then it is a linear combination of the R source packets, i.e., $$[W_1(e), \ldots, W_R(e), Y_1(e), \ldots, Y_N(e)] =$$

$$[w_1 \; w_2 \; \ldots \; w_R] \begin{bmatrix} 1 & 0 & \ldots & 0 & X_{11} & X_{12} & \ldots & X_{1N} \\ 0 & 1 & \ldots & 0 & X_{21} & X_{22} & \ldots & X_{2N} \\ \vdots & \vdots & \ddots & \vdots & \vdots & \vdots & \ddots & \vdots \\ 0 & 0 & \ldots & 1 & X_{R1} & X_{R2} & \ldots & X_{RN} \end{bmatrix}$$

(Here $W_1(e), \ldots, W_R(e)$ are the first R coefficients of the vector 702 in the received packet (i.e., the prefix vector 704), $Y_1(e), \ldots, Y_N(e)$ are the last N coefficients of the vector 702 in the received packet (i.e., the data vector 706), $w_1, \ldots, w_R$ are the coefficients of the linear combination of the original set of data vectors present in the received packet, and $X_{i,1}, \ldots, X_{i,N}$ are the last N coefficients of the vector 702 in the $i^{th}$ original packet 708 (i.e., the $i^{th}$ original data vector 706). From this equation, the vector prefix 704 of the linearly combined packets 710, $[W_1(e), \ldots, W_R(e)]$, is shown to represent this linear combination, i.e., $[W_1(e), \ldots, W_R(e)] = [w_1, \ldots, w_R]$. Furthermore, collecting these vector prefixes 704 $[W_1(e_i), \ldots, W_R(e_i)]$ from each of the R packets, i=1, ..., R, and setting $$W_{R \times R} = \begin{bmatrix} W_1(e_1) & \ldots & W_R(e_1) \\ \vdots & \ddots & \vdots \\ W_1(e_R) & \ldots & W_R(e_R) \end{bmatrix}$$

then $$\begin{bmatrix} W_1(e_1), \ldots, W_R(e_1), Y_1(e_1), \ldots, Y_N(e_1) \\ W_1(e_2), \ldots, W_R(e_2), Y_1(e_2), \ldots, Y_N(e_2) \\ \vdots \\ W_1(e_R), \ldots, W_R(e_R), Y_1(e_R), \ldots, Y_N(e_R) \end{bmatrix} =$$

-continued $$W_{R \times R} \begin{bmatrix} 1 & 0 & \ldots & 0 & X_{11} & X_{12} & \ldots & X_{1N} \\ 0 & 1 & \ldots & 0 & X_{21} & X_{22} & \ldots & X_{2N} \\ \vdots & \vdots & \ddots & \vdots & \vdots & \vdots & \ddots & \vdots \\ 0 & 0 & \ldots & 1 & X_{R1} & X_{R2} & \ldots & X_{RN} \end{bmatrix}.$$

Hence, if W is invertible, the original data shown in the originally sent packets 708 may be solved for using $$\begin{bmatrix} X_{11} & X_{12} & \ldots & X_{1N} \\ X_{21} & X_{22} & \ldots & X_{2N} \\ \vdots & \vdots & \ddots & \vdots \\ X_{R1} & X_{R2} & \ldots & X_{RN} \end{bmatrix} = W_{R \times R}^{-1} \begin{bmatrix} Y_1(e_1) & Y_2(e_1) & \ldots & Y_N(e_1) \\ Y_1(e_2) & Y_2(e_2) & \ldots & Y_N(e_2) \\ \vdots & \vdots & \ddots & \vdots \\ Y_1(e_R) & Y_2(e_R) & \ldots & Y_N(e_R) \end{bmatrix}.$$

If the encoding functions at each internal node are chosen randomly, then $W_{R \times R}$ will be invertible with high probability if the field size is sufficiently large. Indeed, $W_{R \times R}$ will be invertible at any given receiver with probability at least 1-δ if the field size is at least E/δ, where E is the number of edges in the graph and δ is any number greater than zero, and will be invertible at all receivers simultaneously with probability at least 1-δ if the field size is at least TE/δ, where T is the number of receivers. If T is $2^8$, E is $2^{16}$, and the field size is $2^{32}$, then the probability is at least $1-2^{16}=0.999985$ that the code will be invertible at any given receiver. Similarly, if T is $2^8$, E is $2^{16}$, and the field size is $2^{32}$, then with probability at least $1-2^8=0.996$, the code will be invertible at all receivers simultaneously.

Thus, by properly recording a linear combination performed at each internal node that linearly combines data packets, a receiving node may decode the data vectors 706 without knowing the encoding functions at the internal nodes or even the network topology. Indeed, the receiving node (such as the receivers 104 or 106) may decode the data vectors in the packets using the decoding matrices transmitted in the vector prefixes 704. By so doing, packet loss, patterns of link or node failure, and/or any rerouting or change to the network 110—that does not reduce the capacity below R—may be tolerated by a receiver without special notification.

At block 516, the internal node sends the outgoing packet. The outgoing packet, which is a linear combination of synchronized packets also received by the internal node, may next be received by the receiver 104 or 106 or another internal node. The possibility of receipt by another internal node is shown in FIG. 5 with a dashed line having an arrow from block 516 to block 508. Thus, if the next node to receive the outgoing packet is an internal node, the internal nodes treats the packet sent at block 516 as an incoming data packet. As set forth above, the internal node may then combine this incoming data packet with other, synchronized data packets and so forth.

At block 518, the receiver 104 or 106 receives the data packets, and at block 520, the receiver 104 or 106 synchronizes and decodes the data packets to determine originally sent data. The receiver 104 or 106 may perform this decoding as set forth above using the vector prefix 704, or the receiver 104 or 106 may also perform this decoding using similar information carried by the packets, though not necessarily in a prefix.

Also, the receiver 104 or 106 may decode the packets using information about how to decode the packets from a source other than the packets. This other source may determine how to decode the packets or provide information/metadata to aid the receiver 104 or 106 in decoding the packets. This information may include a general topology of the communication network 110 and/or the record of the operations performed at the internal nodes (from block 514).

Priority Encoding of Data

In some cases, the receivers 104 and 106 will not receive as many packets in a synchronized group as the number of packets sent from the sender 102. If, for instance, the sender 102 sends four packets, the first having data a, the second having data b, the third c, and the fourth d, and the first receiver 104 only receives three packets (containing, for example, the linear combinations (3a+213b+9c+24d), (4a+90b+230c+87d), and (a+12b+123c+4d)), the first receiver 106 cannot solve for a, b, c, and d. This failure to receive four packets could be from packet loss, component failure, and just a narrow pipe (hardware, like a low-band-width cable, that doesn't allow a lot of packets to get through in the amount of time needed). Thus the first receiver cannot recover any of the originally sent data. This is called a decoding failure.

Decoding failure due to erasure of one of the four packets may be guarded against by setting d to 0 (or to any other known linear combination of a, b, and c, possibly offset by a known constant) by common agreement between the sender and all the receivers. Then, three packets received by any receiver are sufficient for the receiver to recover a, b, and c. This is a form of error protection, in which redundant information (d) is sent to protect against possible erasures.

However, some receivers may receive one or two packets, while others may receiver all four. Hence it is desirable to have a scheme by which each receiver will be able to recover an amount of information commensurate with the number of packets it receives. This may be achieved by prioritizing the data and protecting the most important data with the most redundancy, the next most important data with the next most redundancy, and so forth.

By prioritizing the original data, the sender 102 may layer its information so that even for small numbers of packets received by a receiver, the highest priority information often gets through. The amount of information that gets through is commensurate with the number of packet received. This is especially well-suited to audio and video information, where codecs, for instance, may easily partition the signal information into layers of priority. The more packets received by the receiver, the higher the quality.

Thus, using this prioritizing, a receiver may tolerate packet loss; degradation due to increasing packet loss is gradual; the sender 102 needs to have only a vague idea of the communication network 110's capacity to determine its sending rate; the capacity to of the receivers 104 and 106 may be achieved individually (i.e., the amount of information received by the receivers 104 or 106 is not restricted to the broadcast capacity, which is the worst case capacity to an individual receiver); loss patterns that reduce the capacity of the network may be tolerated; and loss patterns that affect individual receivers need not affect all receivers.

In this implementation, the communication network 110 at blocks 502 and 520 of FIG. 5 prioritizes data within the data packets. It may prioritize data within packets by setting some of the original data in original packets to zero. In one implementation, the communication network 110 layers data by setting parts of data in a packet to zero, while filling parts of synchronized data in another packet with information.

Thus, in this implementation of blocks 502 and 520, the communication network 110 creates multiple packets of data, with some of the data within the multiple packets set to zero.

Figure 8:
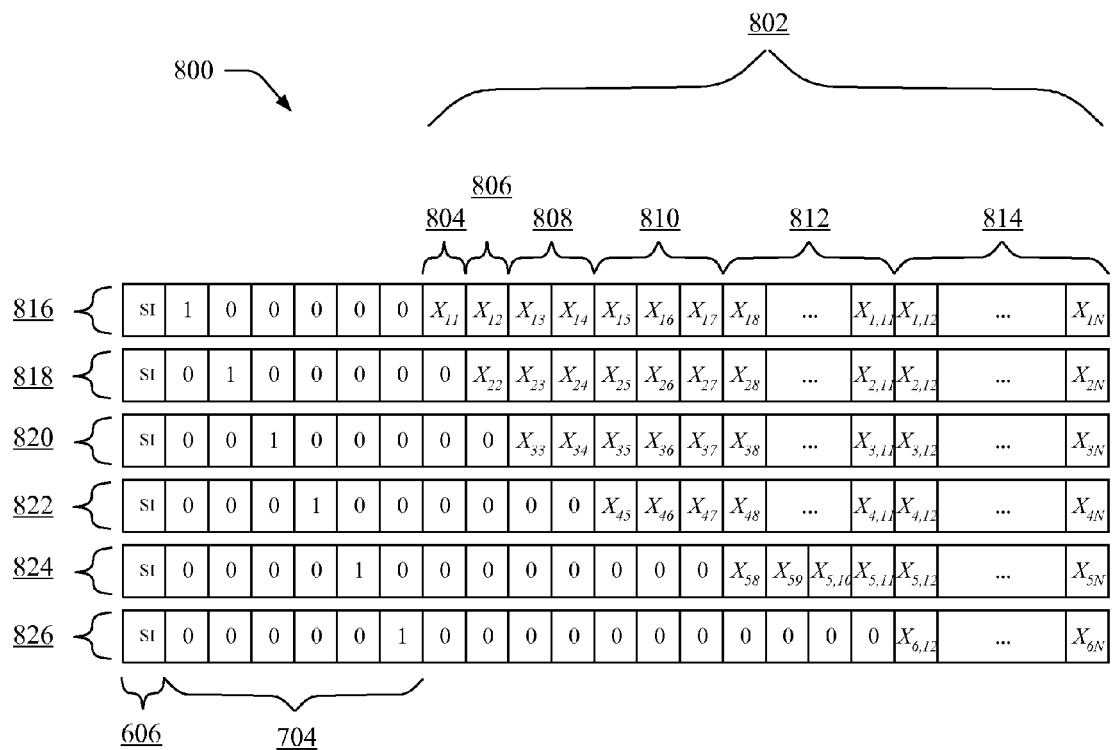
FIG. 8 illustrates models of synchronized data packets having layered data symbols.

FIG. 8 shows an exemplary set 800 of layered original data packets: a first packet 816; a second packet 818; a third packet 820; a fourth packet 822; other packets 824; and a final packet 826. The other packets 824 represent all those original data packets between the fourth packet 822 and the final packet 826. The data packets 816 through 826 each contain the synchronization information (SI) 606 of FIG. 6, the prefix vector 704 of FIG. 7, and a layered data vector 802 rather than the data vector 706 of FIG. 7. The layered data vector 802 and the prefix vector 704 are linearly combined with other data from other packets, the process of which is described in FIG. 5 above.

In this implementation, the layered symbols 802 include six layers of data: a first layer 804; a second layer 806; a third layer 808; a fourth layer 810; other layers 812; and a final layer 814. The other layers 812 represent all those layers between the fourth layer 810 and the final layer 814. It is clear that the first layer 804 contains the highest ratio of redundant information (zeroes in this implementation) to real data, the second layer 806 contains the next highest ratio of redundant information to real data, and so forth. The last layer 814 contains no redundant information, and so the ratio of redundant information to real data is zero.

In this implementation, a receiver may partially decode data in packets (here the layered symbols 802) by decoding the high-priority information. A receiver may partially decode the layered symbols 802 if it receives fewer than R packets in a time slot.

The amount of information decoded is commensurate with the number of packets received. Different receivers may receive different numbers of packets, and decode correspondingly different amounts of information. Indeed, a receiver may decode the first k layers of importance if it receives at least k packets, as shown below. Decoding is therefore robust to packet loss, pattern of link or node failure, and rerouting or changes to the network, which may possibly reduce the capacity below R. Further, the sender 102 does not require a clear idea of the true capacity available to the receivers 104 or 106.

In this implementation of the prioritization, the sender 102 strategically inserts zeros into the transmitted source packets, as illustrated in FIG. 8. However, other known symbols or other known linear combinations of symbols in the other packets, possibly offset by a known constant, could be used.

As shown in FIG. 8, the source information to be transmitted is partitioned into R=6 data layers (some of which may be empty). Data layer k is placed after layers $1, \ldots, k-1$ in the packets, and the source (originally sent) data in data layer k is striped across packets $1, \ldots, k$. Zeros are placed in the remaining R−k packets in data layer k.

These R packets are sent into the network as usual. If only $k \leq R$ packets are received by a receiver, then it collects the vector prefixes $[W_1(e_i), \ldots, W_R(e_i)]$ from each of the k packets, $i=1, \ldots, k$, and sets $$W_{k \times R} = \begin{bmatrix} W_1(e_1) & W_2(e_1) & \ldots & W_R(e_1) \\ \vdots & \vdots & \ddots & \vdots \\ W_1(e_k) & W_2(e_k) & \ldots & W_R(e_k) \end{bmatrix},$$

so that as usual, the received packets may be written as a linear combination of the source packets:

$$\begin{bmatrix} W_1(e_1), \ldots, W_R(e_1), Y_1(e_1), \ldots, Y_N(e_1) \\ \vdots \\ W_1(e_k), \ldots, W_R(e_k), Y_1(e_k), \ldots, Y_N(e_k) \end{bmatrix} =$$

$$W_{k \times R} \begin{bmatrix} 1 & 0 & \ldots & 0 & X_{11} & X_{12} & \ldots & X_{1N} \\ 0 & 1 & \ldots & 0 & X_{21} & X_{22} & \ldots & X_{2N} \\ \vdots & \vdots & \ddots & \vdots & \vdots & \vdots & \ddots & \vdots \\ 0 & 0 & \ldots & 1 & X_{R1} & X_{R2} & \ldots & X_{RN} \end{bmatrix}.$$

Here, however, the receiver has fewer received packets (row vectors in the matrix on the left) than source packets (row vectors in the matrix on the right). But by the above construction, the last R−k packets in the matrix on the right are zero, for the components in data layers 1 through k. If the number of these components is N(k), the receiver 104 or 106 may truncate all the data vectors (the layered symbols 802) to N(k) components, and truncate all the prefix vectors 704 to k components. Thus, $$W_{k \times k} = \begin{bmatrix} W_1(e_1) & \ldots & W_k(e_k) \\ \vdots & \ddots & \vdots \\ W_1(e_k) & \ldots & W_k(e_k) \end{bmatrix}$$

$$\begin{bmatrix} W_1(e_1), \ldots, W_k(e_1), Y_1(e_1), \ldots, Y_{N(k)}(e_1) \\ W_1(e_2), \ldots, W_k(e_2), Y_1(e_2), \ldots, Y_{N(k)}(e_2) \\ \vdots \\ W_1(e_k), \ldots, W_k(e_k), Y_1(e_k), \ldots, Y_{N(k)}(e_k) \end{bmatrix} =$$

$$W_{k \times k} \begin{bmatrix} 1 & 0 & \ldots & 0 & X_{11} & X_{12} & \ldots & X_{1N(k)} \\ 0 & 1 & \ldots & 0 & X_{21} & X_{22} & \ldots & X_{2N(k)} \\ \vdots & \vdots & \ddots & \vdots & \vdots & \vdots & \ddots & \vdots \\ 0 & 0 & \ldots & 1 & X_{k1} & X_{k2} & \ldots & X_{kN(k)} \end{bmatrix}.$$

And, if $W_{k \times k}$ is invertible, the receiver 104 or 106 may solve for the source data components in the first k data layers using $$\begin{bmatrix} X_{11} & X_{12} & \ldots & X_{1N(k)} \\ X_{21} & X_{22} & \ldots & X_{2N(k)} \\ \vdots & \vdots & \ddots & \vdots \\ X_{k1} & X_{k2} & \ldots & X_{kN(k)} \end{bmatrix} = W_{k \times k}^{-1} \begin{bmatrix} Y_1(e_1) & Y_2(e_1) & \ldots & Y_{N(k)}(e_1) \\ Y_1(e_2) & Y_2(e_2) & \ldots & Y_{N(k)}(e_2) \\ \vdots & \vdots & \ddots & \vdots \\ Y_1(e_k) & Y_2(e_k) & \ldots & Y_{N(k)}(e_k) \end{bmatrix}.$$

The receiver 104 or 106 may perform the above calculations without the prefix 704 if the receiver knows $W_{k \times k}$.

One benefit of this prioritizing using zeros is that parity information (such as from an erasure code like a Reed-Solomon code) is not necessary. In this implementation, a separate erasure code is not necessary; this functionality is provided by linear combinations set forth above.

There are many published procedures for optimizing the partitioning of the source information into layers of priority for PET packetization. Publications include: Davis and Danskin, "Joint source and channel coding for image transmission over lossy packet networks," *SPIE Conf. on Wavelet Applications to Digital Image Processing*, Denver, August 1996; Mohr, Riskin, and Ladner, "Unequal loss protection: graceful degradation of image quality over packet erasure channels through forward error correction," *IEEE J. Selected Areas in Communication*, JSAC-18, pp. 819-829, June 2000; Puri and Ramchandran, "Multiple description source coding through forward error correction codes," *IEEE Conf. on Signals, Systems, and Computers*, Asilomar, October 1999; and Stockhammer and Buchner, "Progressive texture video streaming for lossy packet networks," *Proc. 11th Int'l Packet Video Workshop*, Kyongju, May 2001. Any of these may also be used to optimize the partitioning of the source data into layers as described herein. These procedures typically optimize the layers to minimize the expected source distortion given the distortion-rate function D(R) of the source and the probability distribution p(k) of receiving k packets at a randomly chosen receiver.

Also, it is not necessary for a receiver to know, a priori, the boundaries N(k) between layers k−1 and k in the packets. These boundaries may be communicated as metadata, such as in part of the packet header. For a particular format of a packet header, see Leibl, Stockhammer, Wagner, Pandel, Baese, Nguyen, and Burkert, "An RTP payload format for erasure-resilient transmission of progressive multimedia streams," *IETF Internet Draft* draft-ietf-avt-uxp-00.txt, February 2001. For example, metadata could describe the number of symbols in each layer in the packet.

Exemplary Method for Asynchronous Receiving and Sending of Information

Figure 9:
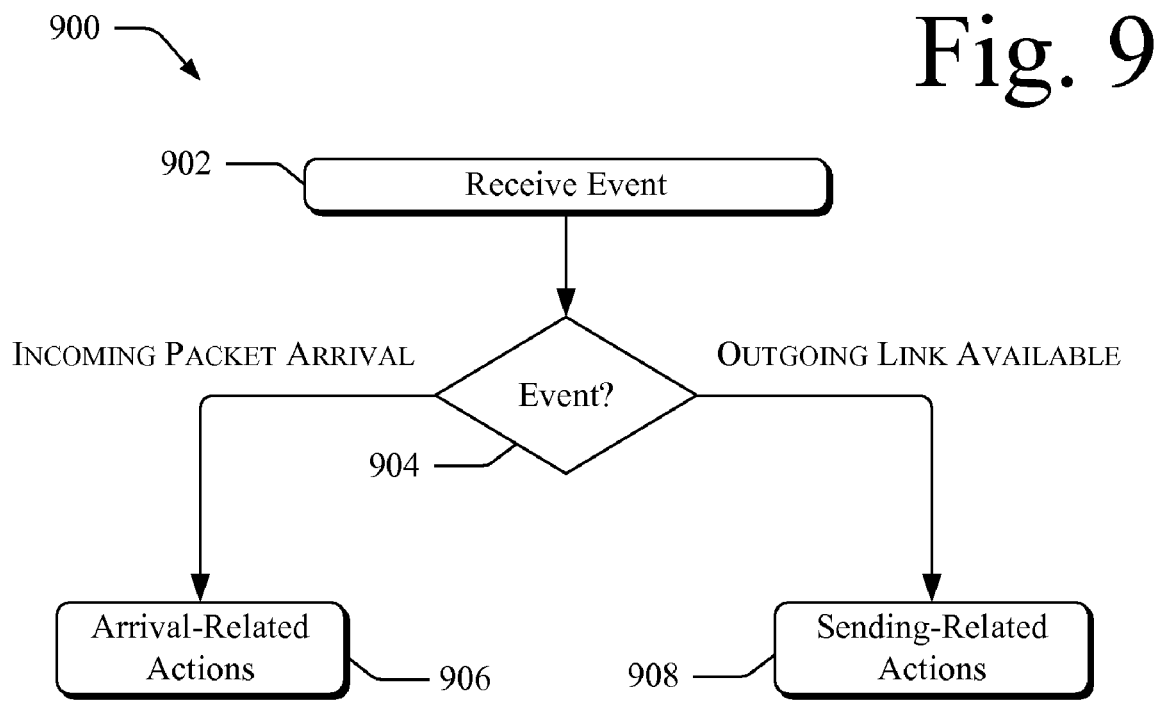
FIG. 9 is a flow diagram of an exemplary process for asynchronously encoding information broadcast over a network.

FIG. 9 shows an exemplary process 900 for asynchronously receiving and sending information broadcast over a network.

For the purpose of discussion, the simple network-coding model 400 of the communication network 110, including its nodes and edges, are used to describe the process 900. This model 400 and the communication network 110 are not intended to limit the applicability of the process 900; other models and other communication networks may be used to implement the process 900 without departing from the spirit and scope of the present invention.

The process 900 (or its parts) may, in some implementations, be used in conjunction with or to replace the block 506, blocks 508 to 516, and/or blocks 518 to 520 of FIG. 5.

At block 902, an exemplary node of the communication network 110 receives an event. In this implementation, the events include INCOMING_PACKET_ARRIVAL and OUTGOING_LINK_AVAILABLE, which respectively indicate the arrival of an incoming packet on an incoming edge and the availability of a time slot in which to transmit an outgoing packet on an outgoing edge. In this implementation, the actions associated with these events are respectively executed in event handlers called OnPacketArrival and OnLinkAvailable. In one implementation, these actions may be performed asynchronously and in parallel with each other and with similar actions at other nodes.

At block 904, if the event indicates the arrival of an incoming packet, the exemplary node of the communication network 110 proceeds along the "Incoming Packet Arrival" path to block 906. If not, it proceeds along the "Outgoing Link Available" path to block 908.

For the purposes of the discussion that follows, unless otherwise indicated, in what follows no distinction is made between the sender node such as 102, intermediate nodes such as 202, 204, 206, and 208, and receiver nodes such as 104 and 106 of the communication network 110. If a node has only outgoing edges (as is usually but not always the case for sender nodes) then it will not receive any events indicating an incoming packet arrival. If a node has only incoming edges (as is often but not always the case for receiver nodes) then it will not receive any events indicating an outgoing link available. Thus, the discussion below on receiving incoming packets pertains only to those nodes that have incoming edges, while the discussion below on sending outgoing packets pertains only to those nodes that have outgoing edges.

At block 906, the exemplary node of the communication network 110 performs various actions associated with receipt of the incoming packet. These actions can include buffering the incoming packet, discarding the incoming packet, and flushing other buffered packets, for instance. These actions are set forth in greater detail in FIG. 12 and FIG. 13 below.

At block 908, the exemplary node of the communication network 110 performs various actions associated with receipt of an event for an outgoing link becoming available. These actions can include linearly combining the data within the incoming packet with other buffered packets and sending the resulting outgoing packet, for instance. These actions are set forth in greater detail in FIG. 14 below.

To better understand the processes described below, an exemplary packet format and buffers in the exemplary node are described and modeled below.

Figure 10:
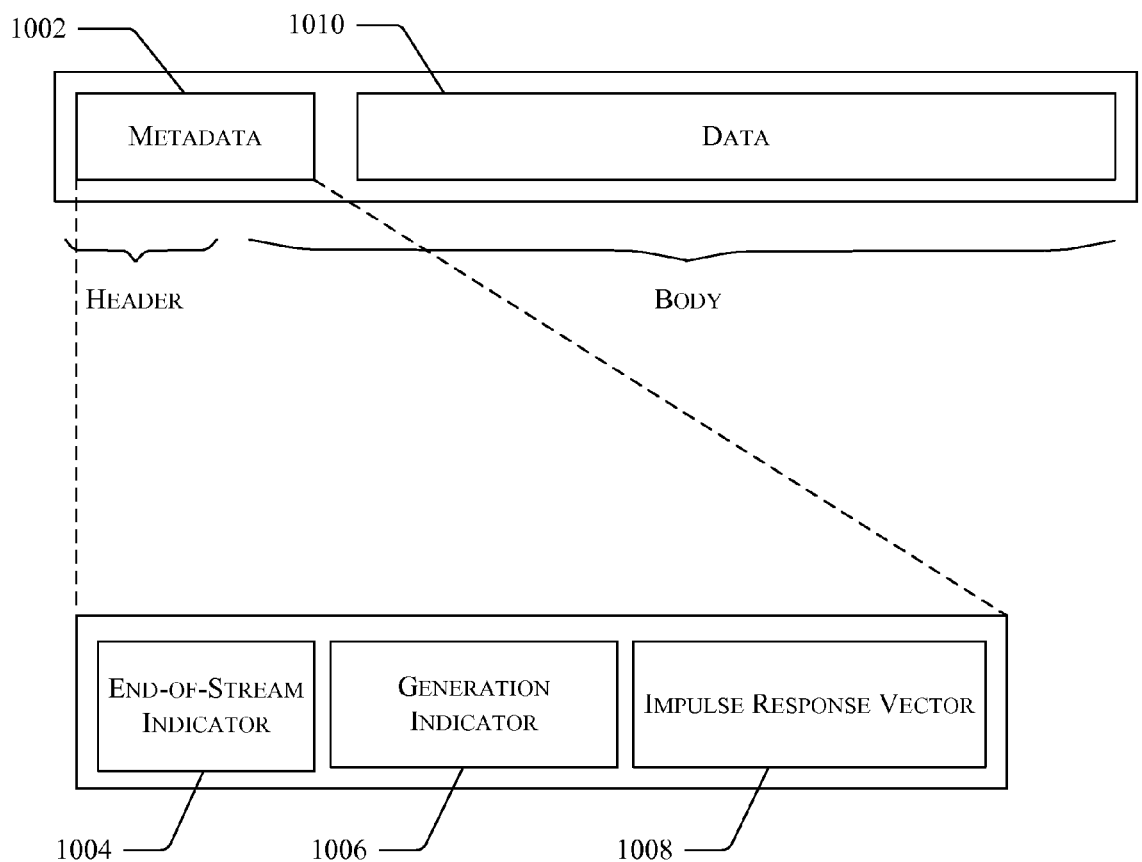
FIG. 10 illustrates an exemplary data packet having an end-of-stream indicator, a generation indicator, an impulse response vector, and payload data.

FIG. 10 shows an exemplary packet 1000 with a metadata 1002 having an end-of-stream indicator 1004, a generation indicator 1006, and an impulse response vector 1008, and data 1010. The packet 1000 is similar to the packet 600, though the metadata 1002 of the packet 1000 includes the end-of-stream indicator 1004, which the metadata 602 does not. The metadata 1002 is an example of the metadata 602, the data 1010 is an example of the data 604, the generation indicator 1006 is an example of the synchronization information 606, and the impulse response vector 1008 is an example of the linear combination coefficients 608, all of FIG. 6.

In this implementation, the end-of-stream indicator 1004 (also called simply "end-of-stream") and the generation indicator 1006 (also called "gen") are in a header part of the packet 1000, while the impulse response vector 1008 (also called "IR") and the data 1010 are in a body part of the packet 1000.

The packet 1000 of FIG. 10 is provided as an example to aid in discussion and is not intended to limit where in a packet metadata and data are stored. In practice, metadata and data may be stored in many different parts of and locations in a data packet, whether singly or in combination. In another implementation, for example, all of the metadata may be stored in the header and all of the data may be stored in the body of the packet 1000.

Figure 11:
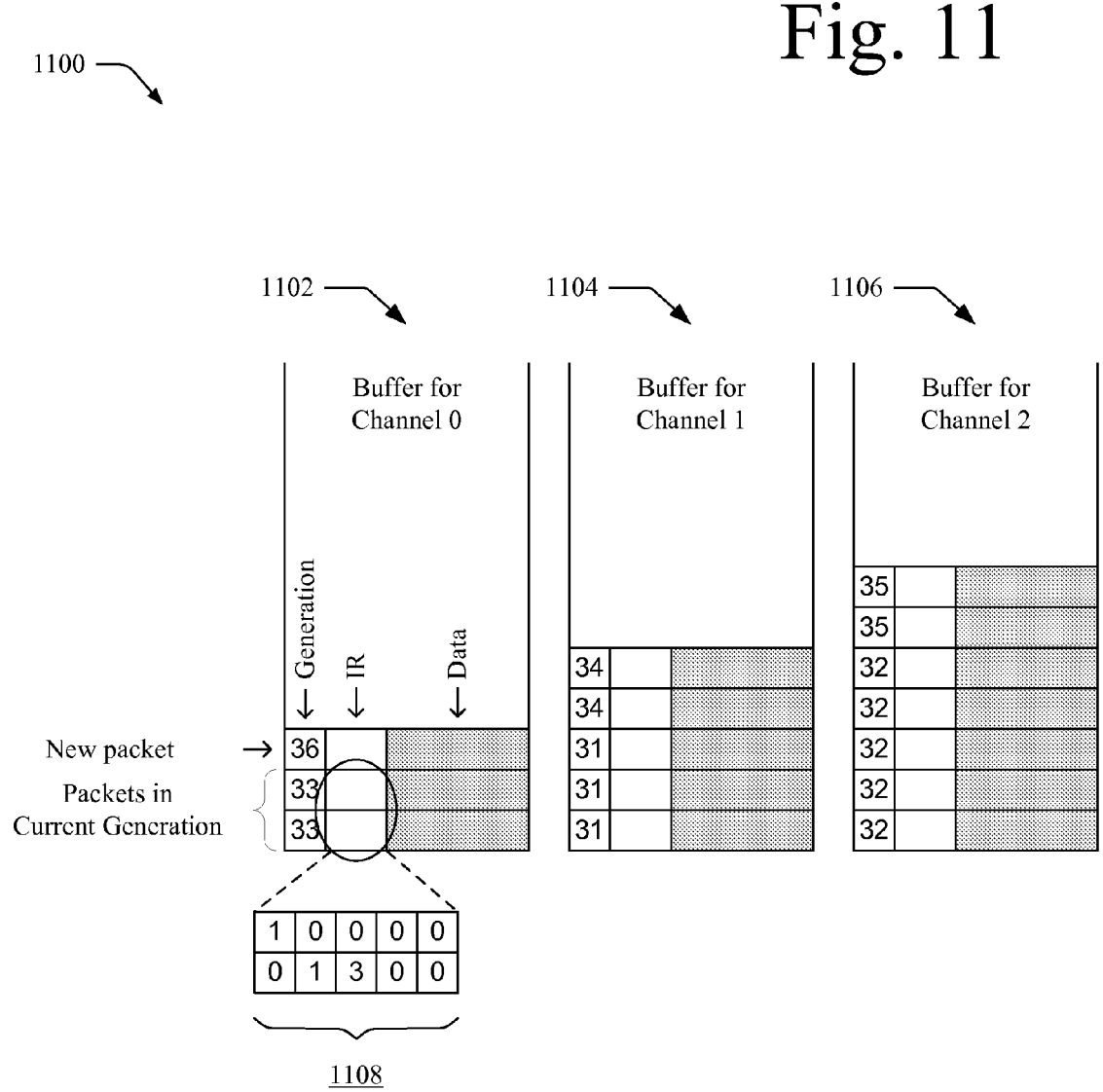
FIG. 11 illustrates multiple buffers of an exemplary internal node of a communication network.

FIG. 11 shows the buffers 1100 of the exemplary node of a communication network, comprising a first buffer 1102 for a channel 0, a second buffer 1104 for a channel 1, and a third buffer 1106 for a channel 2. Although there are three channels in this example, in other examples there may be any number of channels, as discussed below in the section on Reducing Delay Spread via Interleaving. In FIG. 11, each buffer contains several packets. Buffer 1102, for example, contains three packets, each represented by a "row" in the buffer. As discussed above, each packet includes a generation indicator 1006, an impulse response (IR) vector 1008, and data 1010. In this implementation, the generation indicator 1006 is a number, and the channel with which a packet is associated is determined by taking the generation number for the packet modulo 3. Thus, packets whose generation numbers are multiples of three (e.g., 33, 36, etc.) fall into the buffer associated with channel 0; packets whose generation numbers are one more than a multiple of three (e.g., 31, 34, etc.) fall into the buffer associated with channel 1, and packets whose generation numbers are two more than a multiple of three (e.g., 32, 35, etc.) fall into the buffer associated with channel 2. Each buffer has a current generation, which is defined to be the earliest generation in the buffer. For example, the current generation in the first buffer 1102 is the generation of packets with generation number 33, the current generation in the second buffer 1104 is the generation of packets with generation number 31, and the current generation in the third buffer 1106 is the generation of packets with generation number 32. The impulse response vectors 1008 for the two packets in the current generation in the first buffer 1102 are [1 0 0 0 0] and [0 1 3 0 0], showing that the two rows are in standard form. A set of row vectors are in standard form if the leading (i.e., leftmost non-zero) coefficient in each row is 1, while the coefficients above and below the leading coefficients (in the other rows) are zero. A set of row vectors can always be reduced to standard form using Gaussian elimination, which is well known in the art. (See, for example, Noble and Daniel, *Applied Linear Algebra*, $2^{nd}$ ed., Prentice Hall, 1977.) Gaussian elimination consists of a sequence of elementary row transformations. An elementary row transformation is the replacement of a row by a linear combination of two rows. In this implementation, each elementary row operation is applied to a row consisting of the symbols in the impulse response vector and the data in a packet. Gaussian elimination can keep the rows in standard form after each packet is added to the current generation in a buffer. Only the rows in the current generation in each buffer need be kept in standard form. A packet can be unambiguously decoded if after Gaussian elimination its impulse response vector becomes a unit vector. In that case, the data in the same row as the impulse response vector can be inferred to be the data in the $i^{th}$ original packet in the current generation, if the impulse response vector is the $i^{th}$ unit vector (i.e., a vector with 1 in its $i^{th}$ position 0s elsewhere). The linear span of the rows in the current generation in a buffer may be referred to as an inSpace. The "knowledge" of a node comprises its set of inSpaces, which may be labeled inSpace[0] . . . inSpace[K−1], where K is the number of channels. A packet contains no new information if after Gaussian elimination its impulse response vector is the vector of all zeros. This means that the packet already lies in the buffer's inSpace, and does not increase the node's knowledge.

On Incoming Packet Arrivals

Figure 12:
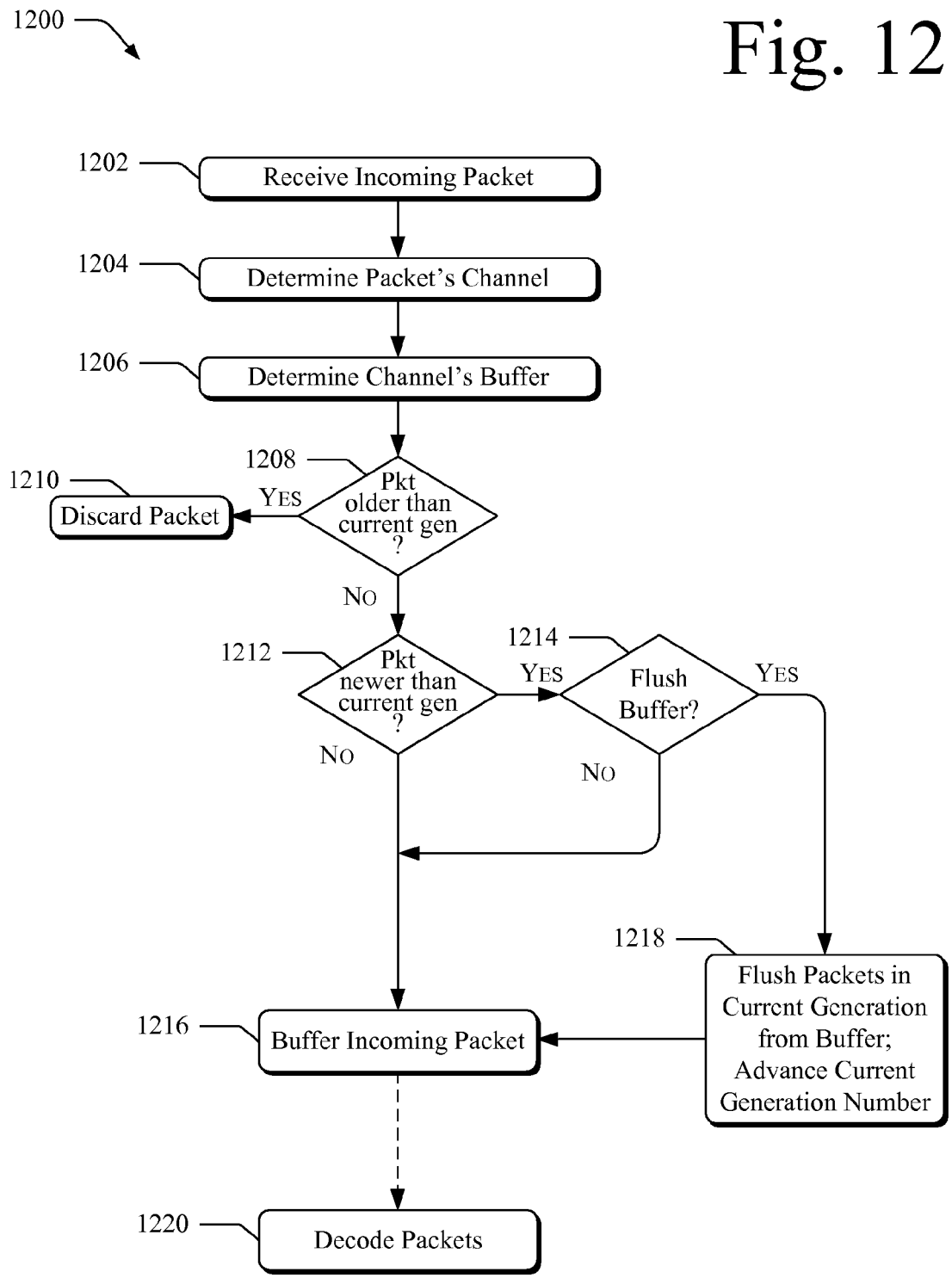
FIG. 12 is a flow diagram of an exemplary process for receiving, buffering, and/or decoding incoming packets.

FIG. 12 sets forth a process 1200, which is an exemplary implementation of block 906 of FIG. 9. In this implementation, the exemplary node of the communication network 110 reacts to an indication that an incoming packet has arrived at the node. In one implementation discussed below, the process 1200 mirrors OnPacketArrival functions.

At block 1202, the node receives an incoming packet of one of various generations of packets sent by the sender 102. The node may receive the packet directly from the sender 102 or from other, internal nodes that received the packet directly or indirectly from the sender 102.

At block 1204, the node determines to which channel the incoming packet is associated. This block and block 1206 are used in cases where the node receives packets from more than one channel and has more than one buffer. In cases where the node does not have multiple channels and multiple buffers, the node skips the blocks 1204 and 1206.

At block 1206, the node determines which buffer (if the node has multiple buffers) is associated with the determined channel. The node uses this buffer for all further processing of the incoming packet.

At any given time, the buffer may contain packets from multiple generations. The current generation in a buffer is defined to be the earliest generation in the buffer.

At block 1208, the node determines whether the incoming packet is older than the current generation in the buffer. If the incoming packet is older than the current generation in the buffer, the node proceeds to block 1210 and discards the incoming packet. If the incoming packet is newer, it proceeds to block 1212. The node can determine the generation of the incoming packet by reading metadata in the incoming packet.

In one implementation of block 1208, the node determines the generation for the packet by reading the generation indicator 1006 from the packet 1000. The generation indicator 1006 may be a number, including numbers from zero on up. In other implementations, generations may be indicated by a time slot, name, time stamp, or sequence number, for example.

At block 1212, the node proceeds to block 1214 if the incoming packet 1000 is newer than the current generation of packets stored in the determined buffer. If not, the communication network 110 proceeds to block 1216.

At block 1214, the node determines whether to flush packets in the current generation from the buffer. Various ways in which the internal node may determine when and whether to flush the buffer are set forth below. These various ways include: 1) flushing when the first packet in any future generation is received on any incoming edge, 2) flushing when a packet in any future generation is received on every incoming edge from a higher node, and 3) flushing according to a predetermined schedule. The latter two of these ways will be discussed further following a discussion of FIG. 18. At block 1214, if the node determined to refrain from flushing a buffer, the node proceeds along the "No" path to block 1216. If not, it proceeds along the "Yes" path to block 1218.

At block 1218, the node flushes the current generation of packets out of the buffer. The node also advances the current generation to the generation of the incoming packet just received.

At block 1216, the node buffers the incoming packet just received.

At block 1220, the node continues to process the incoming packet. The actions in this process are set forth in greater detail in the process 1300, shown in FIG. 13.

At block 1302, a node of the communication network 110 performs Gaussian elimination on the packets in the current generation, to attempt to obtain the packets in the current generation in standard form. The Gaussian elimination may or may not result in a row containing all zeros. If it does, this indicates that the just-buffered incoming packet contains no new data, as it is already a linear combination of the rows in the current generation, i.e., it already lies in the buffer's inSpace. Otherwise, the packet contains new data.

At block 1304, if the packet contains no new data, then the node proceeds along the "No" path to block 1306. Otherwise, it proceeds along the "Yes" path to block 1308.

At block 1306, the node deletes the zero row, or equivalently deletes the just-buffered incoming packet, and then the node proceeds to block 1310.

At block 1308, if the Gaussian elimination at block 1302 resulted in any rows containing unit vectors that were not already unit vectors before the Gaussian elimination, then the node recovers the data vectors associated with the new unit vectors, and thereby decodes the corresponding packets in the original set of data packets in the current generation.

Assume, for example, that after the Gaussian elimination at block 1302 there are two rows in the current generation in the buffer with impulse response vectors [1 0 0 0 0] and [0 1 3 0 0]. Then the node may determine the data in the first packet in the original set of five packets, but may not yet determine the data in any of the four subsequent packets.

If however, a third packet is received for the current generation and after the Gaussian elimination at block 1302 there are three rows in the current generation in the buffer with impulse responses [1 0 0 0 0], [0 1 0 0 0], and [0 0 1 2 0], then the node may also determine the data in the second packet in the original set of five packets, but may not yet determine the data in any of the three subsequent packets.

In general, after a packet is added to the buffer and Gaussian elimination is performed, the data in zero, one, or more packets in the original set of packets may be determined that were not determinable before. Furthermore, in general the data in the packets may not become determinable in any specific order. Thus the data in the second packet in a generation may become determinable before the data in the first packet.

Determining the data in a packet in the original set of packets in a generation is called decoding. Decoding as many packets as possible after each Gaussian elimination is performed is called earliest decoding. Block 1308 performs earliest decoding and is needed only if the node is a receiver. If the node is not a receiver, then the block is optional.

At block 1310, the exemplary node estimates a new data rate. After the exemplary node receives a packet, regardless of the node that transmitted the packet, the exemplary node may estimate a new data rate from the transmitting node. The data rate may be estimated by dividing the number of packets received by the exemplary node from the transmitting node that contained new data by the total number of packets received by the exemplary node from the transmitting node (or a moving average thereof). This number is an estimate of the percentage of packets received by the exemplary node from the transmitting node that contain new information. Packets that contain new information are termed informative.

This estimated rate may be useful in not wasting bandwidth of the communication network 110, as will be discussed at block 1312 and further below.

At block 1312, the exemplary node may adjust the rate at which the transmitting node sends packets. This may be done by the exemplary node negotiating with the transmitting node to reduce its transmission rate (the number of packets per interval of time) to the estimated data rate, or otherwise to adjust its transmission rate to match the estimated rate.

The following is an example of the OnPacketArrival handler.

```
NetworkCodec.OnPacketArrival(Packet pkt)
{
    slot = Map(pkt.gen); // determine packet's channel
    if (inSpace[slot].gen > pkt.gen)
        return; // discard old packets
    else if (inSpace[slot].gen < pkt.gen)
        inSpace[slot].Clear( ); // flush the buffer
    inSpace[slot].Add(pkt); // append this packet into the inSpace
    inSpace[slot].RowTransform( ); // perform Gaussian elimination
    if (this NetworkCodec is a receiver)
        inSpace[slot].EarliestDecoding( );
    if (pkt.EndOfStream && (state == NORMAL) )
        state = EOS; // begin termination proceedings
}
```

With the exemplary handler function shown above, an incoming packet may be mapped to inSpace[slot] according to its generation. The mapping will be described in greater detail later in this discussion. If this incoming packet has an older generation number than that of inSpace[slot], this packet may simply be discarded.

If this packet has a newer generation number, the internal node will clear the inSpace[slot] based on receiving this packet. Then the packet may be added as a last row of inSpace [slot] and elementary row transformations may be applied to maintain the impulse response matrix in the standard form.

On Outgoing Link Available

Figure 14:
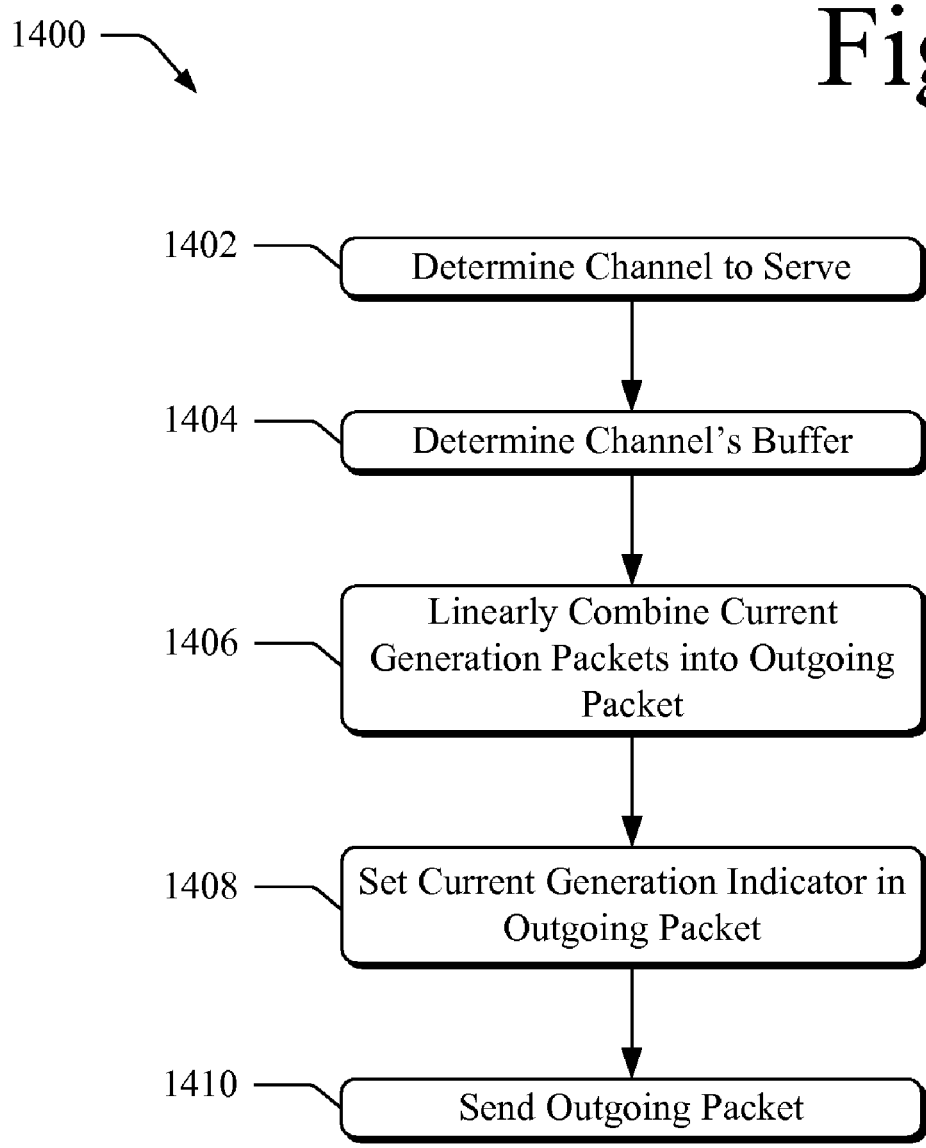
FIG. 14 is a flow diagram of an exemplary process for linearly combining buffered packets and preferentially sending an outgoing packet through a particular channel.

FIG. 14 sets forth a process 1400, which is an exemplary implementation of block 908 of FIG. 9. This process 1400 focuses on how an exemplary node in the communication network 110 addresses and reacts to an indication (such as the OUTGOING_LINK_AVAILABLE event) that an outgoing link is available to send an outgoing packet. In one implementation (discussed elsewhere herein), the process 1400 mirrors OnLinkAvailable handler functions. The discussion of the process 1400 assumes that incoming packets have already been received and buffered in the node.

At block 1402, the node determines a channel in which to send the outgoing packet. This block and block 1404 are used in cases where the node has multiple channels on which to send outgoing packets. In cases where the node does not have multiple channels, the node skips the blocks 1402 and 1404.

At block 1404, the node determines the buffer associated with the channel determined at block 1402. The node may use this buffer for all further processing of the outgoing packet.

At block 1406, the node linearly combines the packets in the current generation in the buffer into an outgoing packet. This may be performed as set forth in the process 500 or as set forth below.

In one implementation, the node waits to combine the packets until the outgoing link is available. In another implementation, however, the node may perform the linear combination and prepare the outgoing packet ahead of time, before the outgoing link becomes available.

In one implementation of block 1406, the node performs a random linear combination of the rows in the buffer into an outgoing packet.

In a further implementation of block 1406, the node performs a random linear combination but restricts the random combining weights. In so doing, the node insures that: 1) the combining weights are not all zero; and 2) the weights for the rows that contain the latest information (e.g., [1 0 3 1 0] contains newer information than [1 1 0 0 0]) are nonzero.

In yet another implementation of block 1406, the node restricts the linearly combined data to a subspace of inSpace, such as by setting the weights to zero for some of the rows containing earlier information.

Also at block 1406, the node may add metadata to the outgoing packet. In the ongoing example of the packet 1000, the metadata includes a recording of the linear combination performed.

In another implementation, the node may record in an impulse response vector 1008 in the metadata the composition of the packet 1000 as a linear combination of data vectors in an original set of data vectors reflecting the payload data 1010, which may contain actual data of the original set of data vectors created from a stream of data sent out in generations by the sender 102.

The impulse response vector added to the outgoing packet may be a result of performing the linear combination on all of the impulse response vectors 1008 from the received packets that were linearly combined. This IR in the outgoing packet will then be an accurate record showing what data vectors are present in the payload data of the outgoing packet.

At block 1408, the node adds an indicator of the current generation to the outgoing packets, such as the generation indicator 1006.

At block 1410, the node sends the outgoing packet on the channel determined to be used at block 1402 (or the only outgoing channel of the internal node), along the outgoing edge.

The following is an example of the corresponding OnLinkAvailable handler.

```
NetworkCodec.OnLinkAvailable(Link lk)
{
    // Determine the inSpace to be served
    // by this transmission opportunity.
    slot = SlotToServe(lk);
    // Generate a new packet as a random linear combination
    // of the rows in the inSpace.
    pkt = inSpace[slot].RandomLinearCombination( );
    if (state == EOS) {
        pkt.EndOfStream = true;
        if (flush signal has been sent on all outgoing involved links)
            terminate( ); // done with transmission
    }
}
```

Flooding a Communication Network

The communication network 110 can be represented as a capacitated directed graph. A capacitated directed graph is a triple G=(V,E,c), where V is a set of vertices, E is a set of directed edges, and c is a an assignment of capacities to the directed edges. A directed edge from a node v in V to a node w in V is denoted vw, and each directed edge vw has a positive capacity c(vw). The size of V is denoted by n. A source node (such as the sender 102) is denoted by s and the receivers (such as the receiving nodes 104 and 106) by $r_1, \ldots, r_L$. A flow $f_i$ on G from s to receiver $r_i$ is a non-negative-valued function on edges satisfying the following constraints:

$$0 \le f_i(vw) \le c(vw), \forall vw \in E$$

$$\sum_{w \in V, wv \in E} f_i(wv) - \sum_{w \in V, vw \in E} f_i(vw) = 0, \forall v \in V \setminus \{s, r_i\}.$$

And a flow value is:

$$|f_i| \equiv \sum_{w \in V, sw \in E} f_i(sw).$$

This single-source single-receiver max-flow problem is a linear program. Here the maximum flow value (over different flow assignments) from s to receiver $r_i$ is denoted with $C_i$. A broadcast capacity C, which is a maximum possible rate for the source to transmit the same information to all the receivers, is:

$$C = \min C_i.$$

Given a flow f on G=(V,E,c), the sub-graph $G_f(V_f, E_f, f)$ composed of the edges with positive flow assignment using can also be referred to as a "flow." Here the capacity assignment for each edge vw of $G_f$ is f(vw) instead of c(vw). Here also the notation G'=(V',E',c')⊲G(V,E,c) is used to indicate that (V',E') is a sub-graph of (V,E) and c'(vw)≦c(vw), ∀vw∈E' ⊂ E. Each G'⊲G corresponds to a feasible utilization of bandwidth resources of G.

Network codecs may be employed at nodes in a communication network. They may be employed strategically at certain nodes, or at every node of the network. Employing codecs at every node may be used to flood the network. Flooding the network means transmitting data packets over every link in the network at the link capacity. If codecs are employed at every node in the network, they may transmit data packets to every neighbor, thereby flooding the network. In a small network, such as an intranet rather than the Internet, this use of codecs to flood the small network may be an effective solution for broadcasting information using network coding.

In a large network, such as the Internet, it is expected that not every node contributes to the information delivery of a multicast session. Therefore, using codecs at each node will not efficiently utilize the available network bandwidth. Strategic placement and use of codecs may be used instead, thereby involving those nodes contributing to the multicast session. Identifying which nodes of the large network contribute to a broadcasting session is discussed in greater detail below.

The strategic employment of codecs may also be useful in situations where not every node of a network (such as the communication network 110) is capable of equipping network codecs. In this case, the network 110 may be a mixture of routing nodes and coding nodes. The consequence of this is a potential reduction in the achievable throughput.

For a node capable of doing network coding, one codec or one codec per outgoing link or edge may be used. If one codec is used, it is called a "codec on node" and when one is used per link (edge), it is called a "codec on edge."

Figure 15:
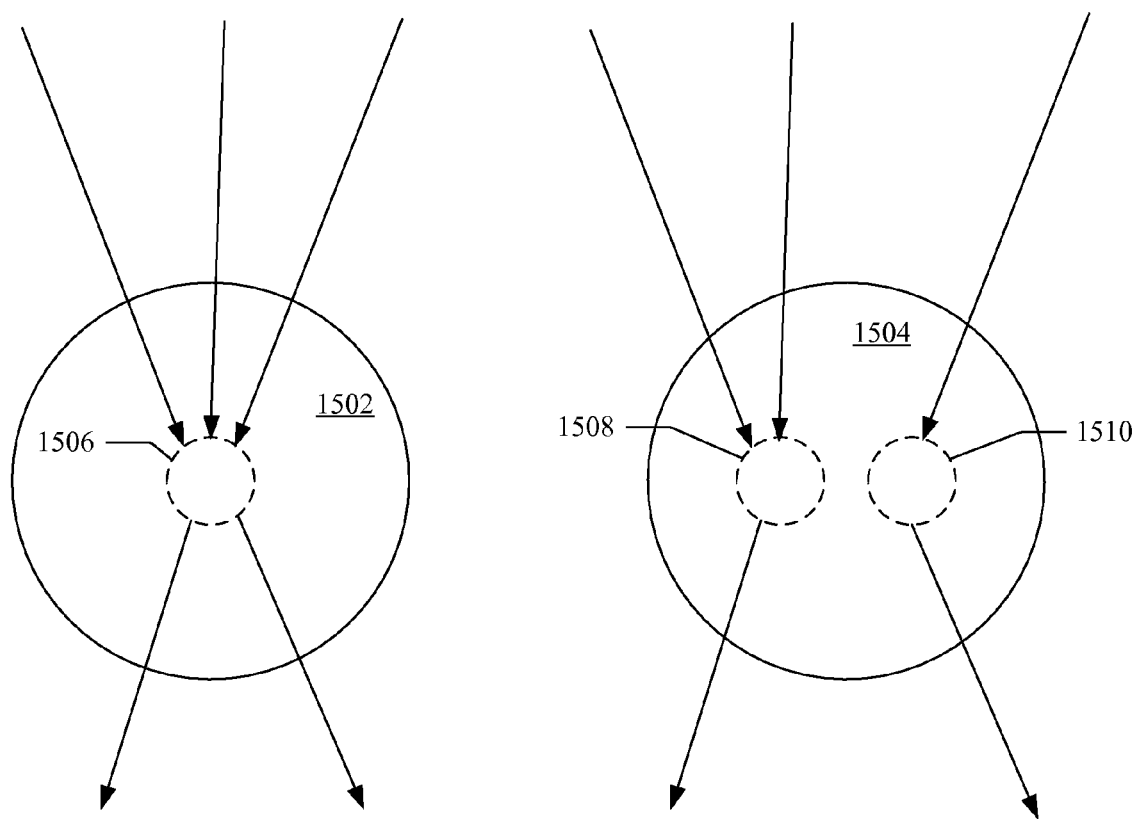
FIG. 15 illustrates two nodes of a communication network, a one-codec node and a two-codec node.

FIG. 15 shows two nodes of a communication network, a one-codec node 1502 and a two-codec node 1504. Both of the nodes 1502 and 1504 have three incoming edges/links and two outgoing edges/links. The one codec node 1502 includes a codec-on-node 1506. The two-codec node 1504 includes a first codec-on-edge 1508 and a second codec-on-edge 1510.

The two-codec node 1504 allows for distinguishing coding operations among the outgoing links. In the node 1504, the association of incoming edges to outgoing edges may be constructed via a careful analysis of the structure of path-flows. With the codec-on-node 1506, certain cycles may be present that are absent with the codecs-on-edge 1508 and 1510. The implications of cycles will also be discussed later.

Although network coding may be applied by flooding an entire network, flooding is often an inefficient use of the network's resources. To address this inefficiency, various systems and methods that restrict the flooding are set forth below. In one implementation, these systems and methods may restrict the flooding to a capacitated sub-graph (or a sub-network) G'⊰G without sacrificing a throughput, which may be set to be the broadcast capacity. In this implementation, the sub-network only refers to the collection of edges that contribute to the multicast session (from sender s to receiver set T). The contributing edges may then transmit packets at a maximum rate.

In another implementation, the sub-network further refers to the assigned transmission rates on each of the contributing edges that are dedicated to the multicast session. In this case, the contributing edges may transmit packets at the assigned rate.

Figure 16:
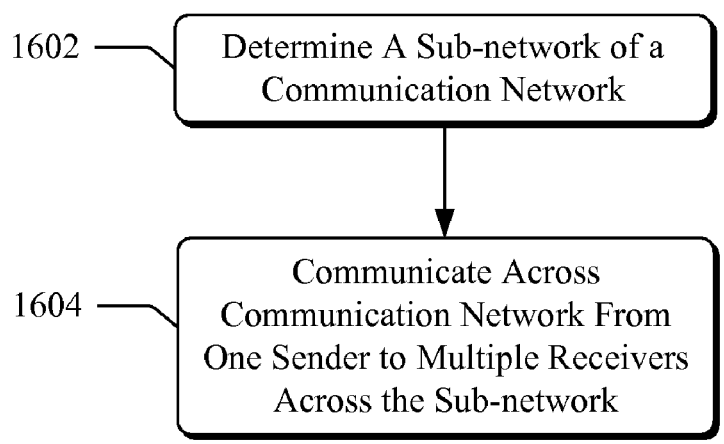
FIG. 16 is a flow diagram of an exemplary process for determining and using a sub-network of a network for sending data between a single sender and multiple receivers.

FIG. 16 shows an exemplary process 1600 for determining and communicating on a sub-network of a network between a single sender and multiple receivers.

For the purpose of discussion, the network-coding model 400 of the communication network 110, in conjunction with the one-codec node 1502, the two-codec node 1504, their incoming and outgoing edges/links, the codec-on-node 1506, the first codec-on-edge 1508, and the second codec-on-edge 1510, are used to describe the process 1600. The packet 1000 will also be use in the discussion. The model 400, the communication network 110, the nodes 1502 and 1504, the codecs 1506, 1508, and 1510, and the packet 1000 are not intended to limit the applicability of the process 1600; other models, nodes, codecs, packet formats, and communication networks may be used to implement the process 1600 without departing from the spirit and scope of the present invention.

At block 1602, the communication network 110 determines a sub-network in the communication network 110 between the sender 102 and the receivers 104 and 106.

At block 1604, the sender 102 communicates to the receivers 104 and 106 over edges in the sub-network.

In FIG. 16, the process of determining a sub-network and the process of communicating on the sub-network are drawn sequentially for illustrational purposes. In one implementation, these two processes may be carried out one after the other.

In another implementation, the process of determining can be done in one or more steps by modifying the sub-network incrementally, which is allowed to overlap in time with the process of communicating. As a more concrete example of this latter implementation, suppose a very long data stream (e.g., 100 Mega-bytes of data) is to be multicast from the sender to the receivers. Initially, for the first few generations of packets, flooding may be used. During this start-up time period, the intermediate nodes 202, 204, 206, and 208 of the network 110 can collect sufficient amounts of data and perform some statistics, such as what proportions of packets flowing on each edge is innovative, i.e., containing new information that is not present in the packets previously received at a network codec at the applicable intermediate node.

Next we describe systems and methods for restricting flooding of a communication network into a sub-network.

In a first implementation, the sub-network is determined by reducing the assigned communication rates on the edges, eliminating non-contributing edges in the communication network 110, and, in some cases, further backtracking contributing nodes from the receivers.

In second, third, and fourth implementations set forth below, systems and methods that restrict flooding of a communication network (such as the communication network 110) using a union of flows are described. The union of flows is used to define the sub-network. A union of flows is defined in the following way. For an information multicast session in consideration, denote the sender by s and the associated receivers by $r_i$, i=1, ..., L. First, given a set of flows $f_i$, i=1, ..., L, one for each pair $(s,r_i)$, i=1, ..., L, the union of flows is a function g defined on the edges:

$$g(vw) \equiv \max_{i=1,...,L} f_i(vw), \forall\ vw \in E.$$

If each flow has a flow value greater than or equal to the broadcast capacity, i.e., $|f_i| \geq C$, i=1, ..., L, then the sub-graph $G_g$ of G, with capacity re-assigned according to g, has the same broadcast capacity C. Thus, any union of flows, satisfying $|f_i| \geq C$, i=1, ..., L, is sufficient to have the broadcast capacity C. On the other hand, if a capacitated sub-graph G'⊰G has the same broadcast capacity C, then ∃G", G"⊰G', where G" is a union of flows. This shows that one union of flows is necessary to support the broadcast capacity C. To make use of a union of flows, network codecs may be employed on a sub-graph of a union of flows to efficiently make use of the communication network's 110 bandwidth.

In a second implementation, a union of flows is determined by restricting a magnitude of each flow of a union of flows between the sender 102 and each of the receivers 104 and 106 to a same value.

In a third implementation, a union of flows is determined using an optimization, such as a linear program.

In a fourth implementation, a union of flows is determined, using existing distributed algorithms for finding two or more flows, each from the sender to one of receivers, synchronizing the distributed processes for finding two or more flows, and exchanging combined messages between neighboring nodes. Here each combined message may contain multiple messages generated by the distributed processes for finding each individual flow.

Figure 13:
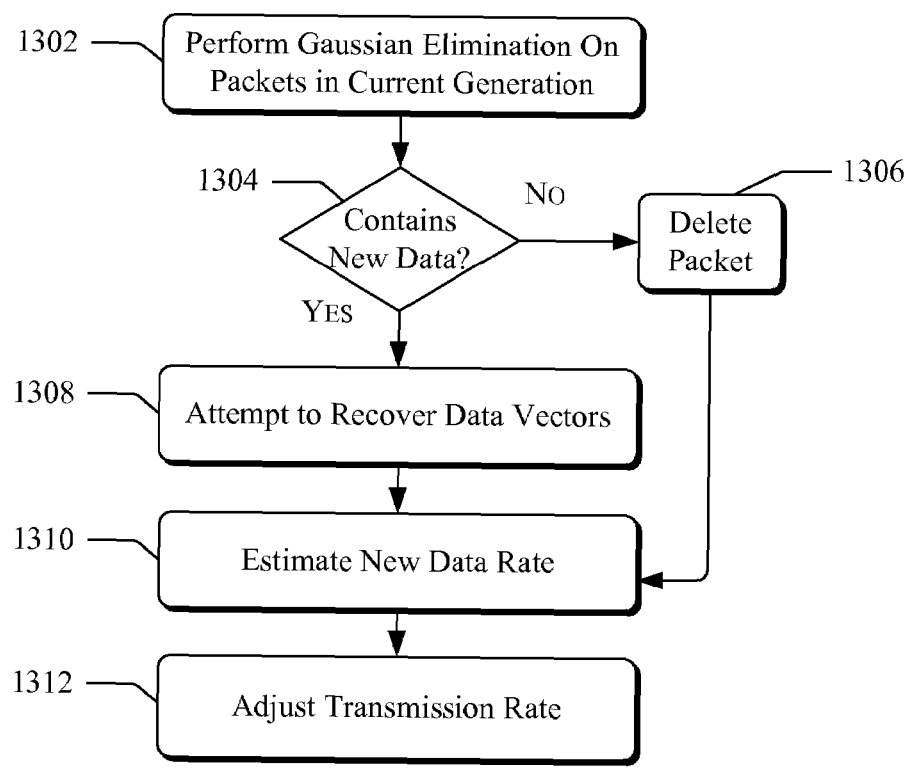
FIG. 13 is a flow diagram of an exemplary process for early decoding of information from packets broadcast over a network.

Examples of the above implementations of the block 1602 are set forth below and use the following model, which is a continuation of the model set forth as part of and following the description of FIG. 13. This model is intended to aid in understanding exemplary ways in which each implementation may be exercised, but is not intended to limit the applicability of the process 1600.

Determining a Sub-Network by Reducing Rates on Edges and Eliminating Non-Contributing Edges and Nodes In the first implementation of block 1602, a union of flows is determined by properly reducing the communication rates on edges in the communication network 110, eliminating non-contributing edges, and, in some cases, further back-tracking contributing nodes from the receivers and eliminating non-contributing nodes.

As set forth in the process 1300, a network codec may be used to determine whether packets received are innovative. Also, if the codec may determine from which edge packets are received, it may determine a rate of innovative information received at incoming edges (such as with the codecs-on-edge 1508 and 1510). Using this information, the network codec may keep track of patterns of innovations arriving along each incoming edge. If an incoming edge does not provide any innovative packets, it is non-contributing to the knowledge of this network codec and hence to the multicast session. If it provides a low-level of contribution, it may also make sense to eliminate that edge in determining a union of flows (though this union of flows, while more economic, may not allow maximum throughput). To effectuate this, a node (such as the node 1504, including through one of the network codecs 1508 and 1510) may send an upstream packet to stop use of that edge to send it packets. Alternatively, nodes may implement "positive acknowledgement", i.e., notify upstream nodes only about contributing edges. Then, an absence of positive acknowledgement can be used as an indication that an edge is non-contributing. Other signaling schemes are also possible. Following the process 1300 may reduce waste of bandwidth and create an economic union of flows.

For example, the rate of innovative packets on an edge can be estimated and that rate can then be fed back to upstream node as the assigned communication rate on this edge. The rate of transmission of new information may be determined in various ways, including by nodes of the communication network 110 following the process 1300. These techniques can be used to locally adjust the operational network topology for a more economic use of network bandwidth.

In another example of the first implementation, an adjustment can be done by back-tracking the contributing nodes from the receivers (e.g., 104 and 106) and eliminating non-contributing nodes from the communication network 110. A node can be labeled contributing if one or more of its outgoing edges are contributing edges, and vice versa. After a node is labeled non-contributing, the incoming edges to the node are labeled non-contributing edges and these changes of state are fed back to the upstream nodes.

The labeling of contributing nodes/edges may be performed by flooding a first generation of packets across the network 110 (or an economic sub-network) at a high enough rate to explore the network 110. After that, each of the receivers 104 and 106 may inform upstream nodes that certain edges have contributed to its knowledge and possibly the assigned rates. Then, the contributing nodes further notify their upstream nodes that certain edges have contributed to its knowledge. By continuing this procedure, all contributing nodes (and/or codecs) and edges may be identified. Those that are not contributing will not be included in this union of flows.

Restricting Flow Magnitude to a Broadcast Capacity to Determine a Union of Flows In the second implementation of block 1602, a union of flows is determined by restricting a magnitude of each flow of a union of flows between the sender 102 and each of the receivers 104 and 106 to a same value, which is the desired throughput. The highest throughput that can be supported is the broadcast capacity. This results in a more economical union of flows than, for example, taking the union of maximum-flows.

Determining a Most-Economic Union of Flows Using an Optimization

In the third implementation of block 1602, an economic union of flows is determined using an optimization, such as a linear optimization program.

A union of flows may not be unique. Because of this, a union of flows may not be the most-economic union of flows for the communication network 11.

For instance, a flow from s to $r_i$ satisfying $|f_i| \geqq C$ often is not unique. And, because of this, a union of flows often is not unique. Consequently, various unions of flows may differ in utilization of a network's bandwidth, some of which are more economic than others. To determine which is more or most economic, the following optimization program may be used.

In an example of this implementation, a finding of a most-economic union of flows may be formulated as a linear program, assuming a pricing function regarding a usage of each edge is linear in g(vw). Without essential loss of generality, assume the price for using g(vw) out of c(vw) is just g(vw). Then the most-economic union of flows may be obtained through the following linear program:

$$\min \sum_{vw \in E} g(vw)$$

$$g(vw) \geq f_i(vw), \forall\, vw \in E$$

$$0 \leq f_i(vw) \leq c(vw), \forall\, vw \in E$$

$$\sum_{w \in V: vw \in E} f_i(vw) - \sum_{w \in V: wv \in E} f_i(wv) = 0, \forall\, v \in V \setminus \{s, r_i\}$$

$$\sum_{w \in V: sw \in E} f_i(sw) - \sum_{w \in V: ws \in E} f_i(ws) \geq C$$

This exemplary linear program has a feasible solution. The solution may be given by an initial (non-optimized) union of flows obtained from running union-of-flow algorithms for each of multiple source-receiver pairs in the communication network 110.

Determining a Union of Flows with a Distributed Algorithm

In the fourth implementation of block 1602, a union of flows is determined, using existing distributed algorithms for finding two or more flows, each from the sender 102 to one of receivers 104 or 106, synchronizing the distributed processes for finding two or more flows, and exchanging combined messages between neighboring nodes. Here each combined message may contain multiple messages generated by the distributed processes for finding each individual flow.

There are known distributed algorithms for a single-source, single-receiver max-flow problem. For an example of one distributed algorithm, see Goldberg and Tarjan, "A new approach to maximum-flow problem," *J. of ACM*, vol. 35, No. 4, pp. 921-940, October 1988. The distributed implementation of this algorithm synchronizes locally via message exchanges with neighbors.

Thus, to find a union of flows, the communication network 110 may run the distributed max-flow algorithm of Goldberg and Tarjan, supra, for every receiver. Then the communication costs are added up across the receivers. To reduce the communication costs, this implementation computes all flows at the same time and piggy-backs the exchanged messages for all $f_i$'s together. By so doing, each message exchange may convey a vector of elementary messages, one for finding the max-flow to each receiver.

Delay Spread

The following discussion sets forth one way of describing a problem in packet networks called "delay spread." This problem will be set forth to aid in a subsequent description of a system and method for helping to alleviate this problem.

A flow in the communication network 110 may be decomposed into a sum of path-flows (a path-flow is a flow f with f(vw)=|f| along the edges in the path.) In so doing, information flowing from the source 102 to each of the receivers 104 and 106 may be viewed as flowing along parallel paths. Here the path delay is the total time for a packet to travel along a path. The path delay is thus a sum of extra delays experienced at each node, each term consisting of: link propagation delay+ transmission time (pktSz/speed)+queuing delay+processing delay.

Figure 17:
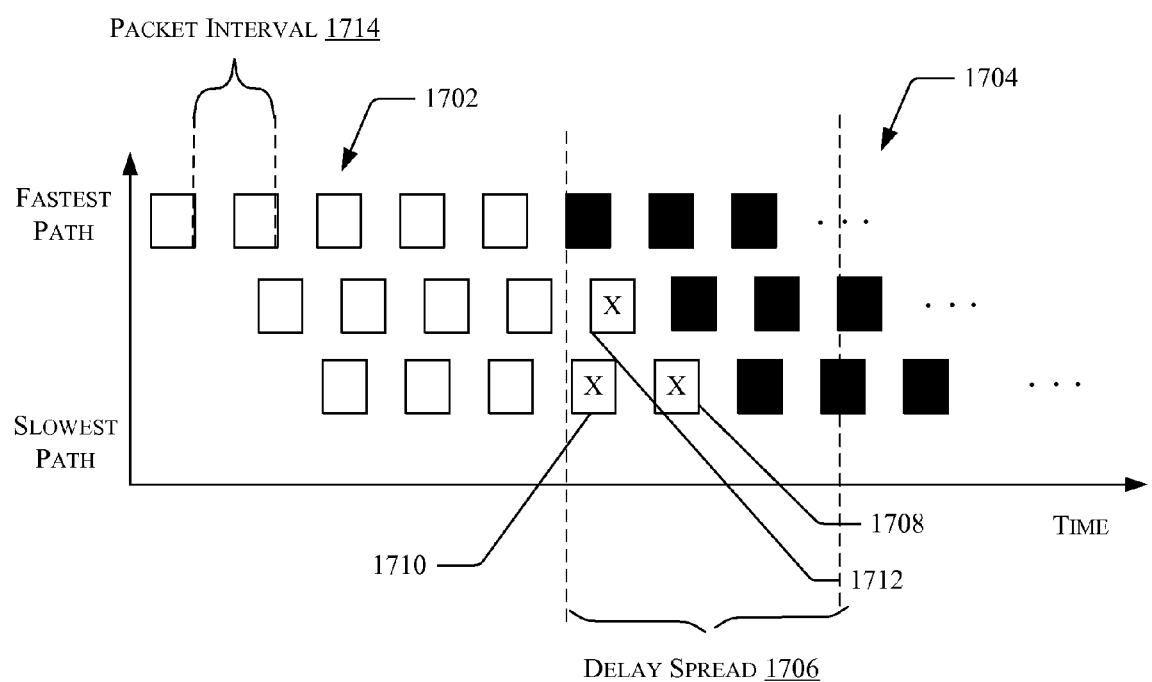
FIG. 17 illustrates a potential delay spread for packets traveling in a communication network.

FIG. 17 graphically depicts with a graph 1700 a potential delay spread phenomenon for packets traveling in the communication network 110. The horizontal axis is time of packet arrival. Each row of boxes represents the arrival times of packets traveling over different paths, with the top row representing the path with the lowest delay and the other rows representing paths with higher delay. Empty boxes are packets of an early generation 1702. Solid boxes are packets of a next generation 1704.

Different paths may have different delays. Here a delay spread is a difference in time that it takes the first packet in a generation to reach a node over a fastest path and a slowest path, shown at a delay spread 1706.

The graph 1700 shows an example of how delay spread may lead to a reduction in the achievable throughput. One trace of receipt times along a path is shown as one row.

If the early generation 1702 and the next generation 1704 have the same number of original packets, such as fifteen (not all shown). And, if the generations are sent one after the other and each network codec has only one channel of inSpace, an outgoing link may be modeled as a server with a certain service rate (in queuing theoretic language).

Then, each time a packet in one generation is transmitted along a link, the link has served the generation once. Since the packet stream is partitioned into equally sized generations in this example, in steady state, each contributing link serves each generation for the same number of packets in order for the system to be stable.

If the codec flushes a buffer when a first packet of a new generation is received (which is not always the case), on receipt of the first packet in a new generation that maps into a particular channel, the buffer for the channel is flushed. Equivalently, the arrival of the first packet in a new generation may be used to clock the time boundaries to serve each generation. As a consequence, three packets 1708, 1710, and 1712 are discarded, shown in the graph 1700.

Based on these assumptions, a formula for estimating the number of packets lost along the longest path can be:

Delay spread (in seconds)/packet interval (in seconds).

An example of the delay spread is shown as the delay spread 1706. An example of the packet interval is shown as a packet interval 1714 in FIG. 17.

The delay of information along each path may be measured (and hence the delay spread). If the local path-flow information is available to nodes (or edges), then the communication network 110 may send one probing packet per path to explicitly measure which path is the longest path. Each intermediate node may forward this probing packet without any coding operations or extra waiting. To enable time-measurement, the probing packet may either carry its generation time or have the cumulative delays updated at each node.

Reducing Delay Spread Problems

Reducing Delay Spread Via Interleaving

Figure 18:
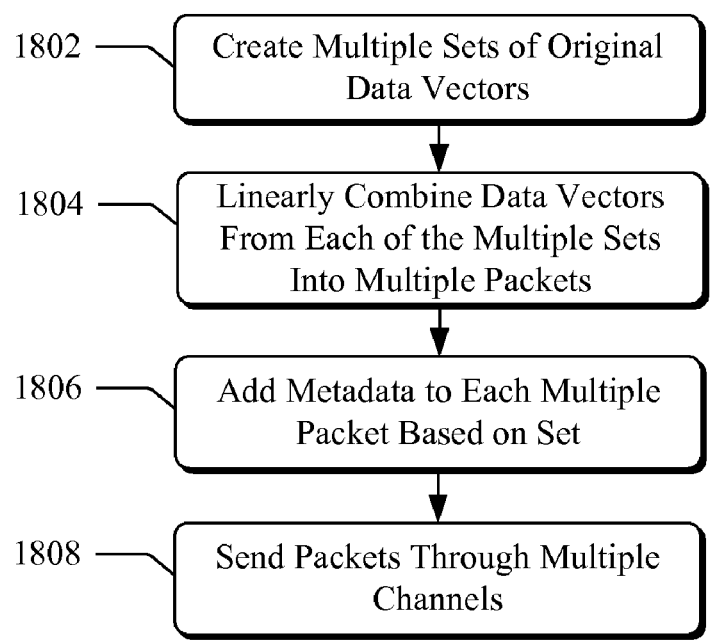
FIG. 18 is a flow diagram of an exemplary process for reducing problems associated with delay spread by interleaving packets and creating multiple channels.

FIG. 18 shows an exemplary process 1800 for reducing problems associated with delay spread. The process 1800 may do so by creating a certain number of channels for packet communications in the communication network 110, through partitioning the original stream of packets into interleaved sub-streams at the sender, and applying separate buffering and scheduling of output packets to each channel at every network codec. Let I denote the number of channels, which is also called the interleaving length. With interleaving, the original multicast session is partitioned into I logical sessions, each transmitting at rate approximately 1/I of the original rate. By so doing, two consecutive packets belonging to one generation have a larger spacing and hence the throughput loss due to delay spread is reduced.

For the purpose of discussion, the simple network-coding model 400 of the communication network 110, including its nodes and edges, are used to describe the process 1800. This model 400 and the communication network 110 are not intended to limit the applicability of the process 1800; other models and other communication networks may be used to implement the process 1800 without departing from the spirit and scope of the present invention.

The process 1800 may, in one implementation, be used in conjunction with or to replace the blocks 502 to 506 of the process 500.

Figure 1:
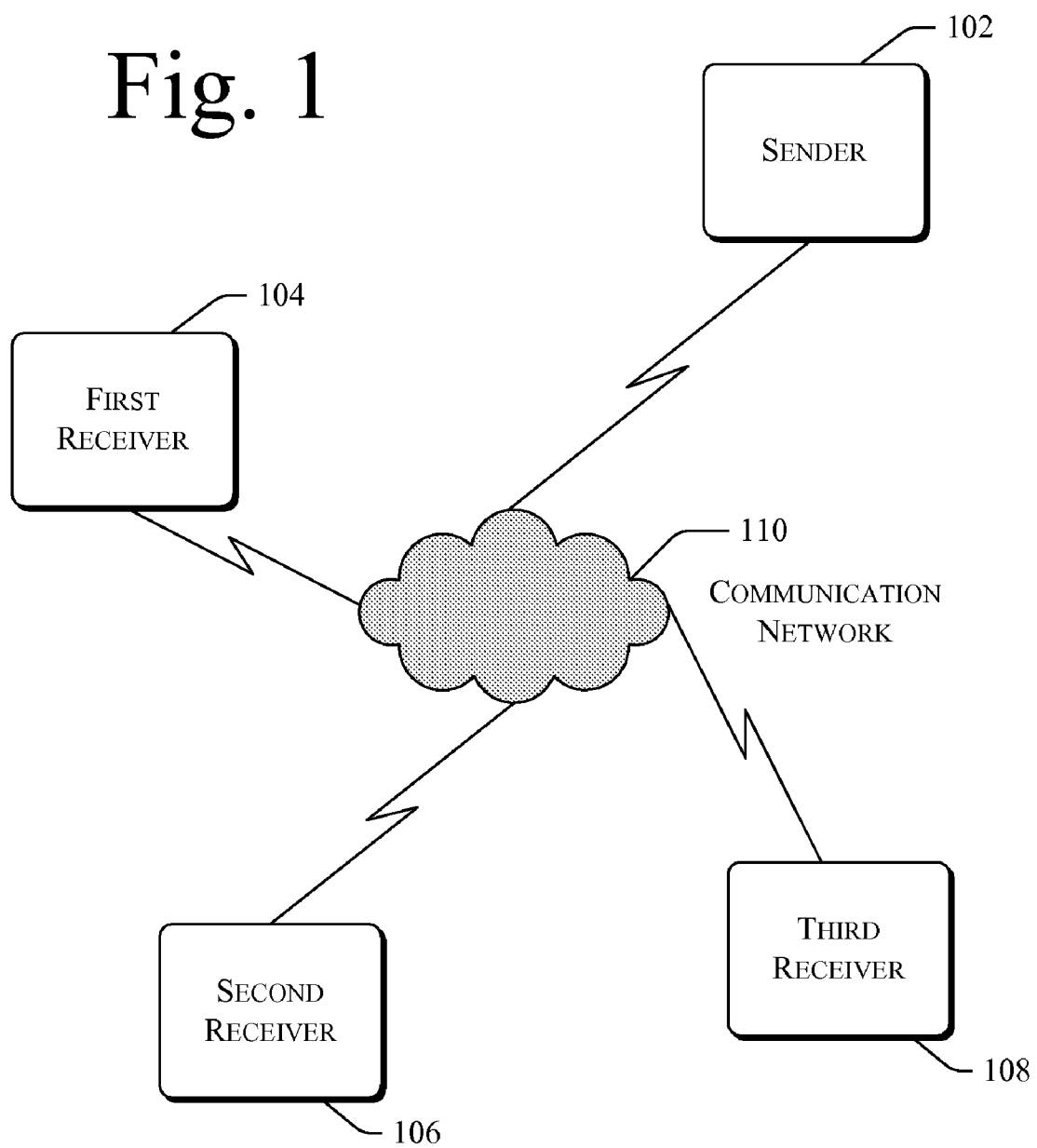
FIG. 1 illustrates a data sender, a communications network, and three data receivers.
Figure 2:
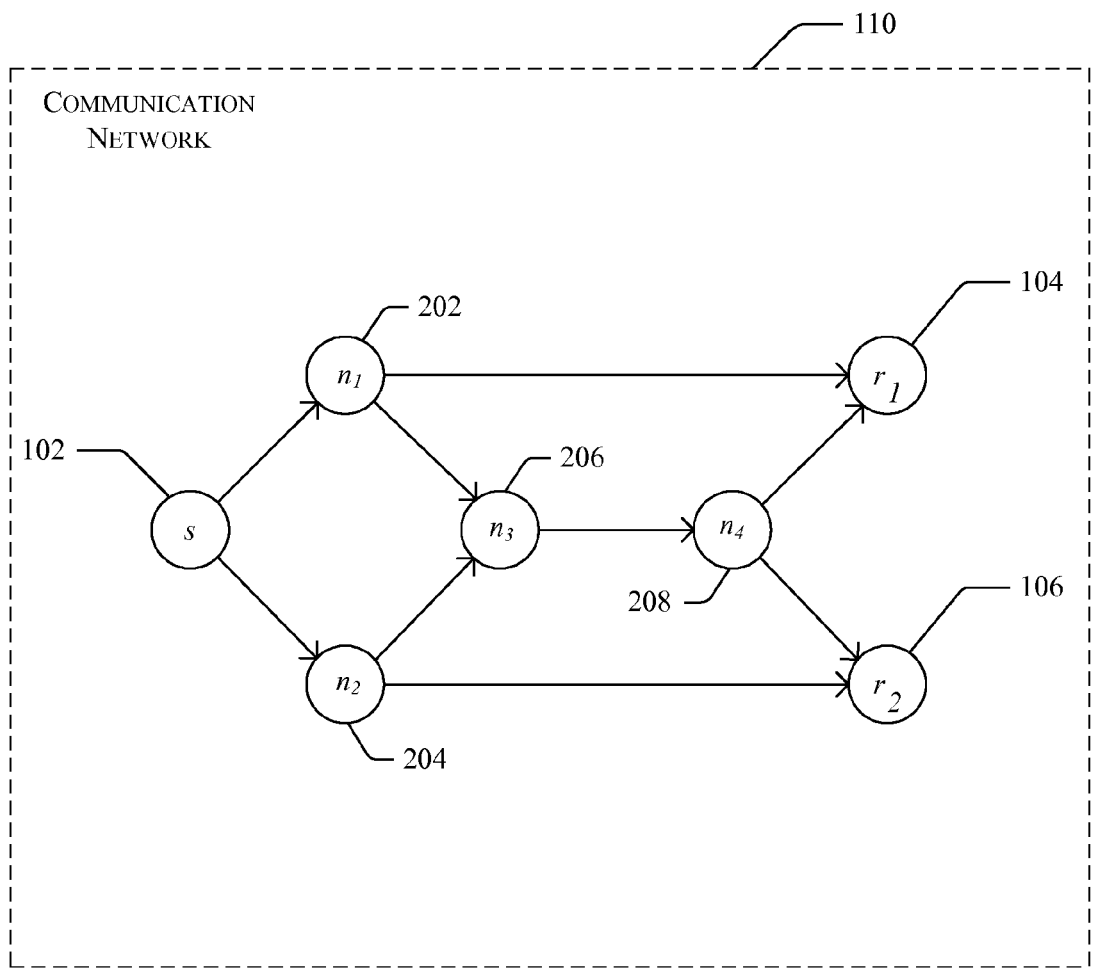
FIG. 2 illustrates a simple model of a communication network having nodes representing a sending node, intermediate nodes, and receiving nodes.

At block 1802, a node of the communication network 110 creates multiple sets of original data vectors. This node may be the sender 102 of FIG. 1 or one of the intermediate nodes 202, 204, 206, or 208 of FIG. 2. The communication network 110 may create these data vectors in ways set forth elsewhere herein, such as set forth in block 502 of the process 500.

At block 1804, the communication network 110 linearly combines data vectors from each of the multiple sets of original data vectors into multiple packets of different generations. The communication network 110 may combine data vectors in ways set forth elsewhere herein.

At block 1806, the communication network 110 adds metadata to each of the multiple packets based on which of the multiple sets of original data vectors of which the packet contains data vectors. For the packet 1000, this metadata may include or be included in the generation indicator 1006.

At block 1808, the communication network 110 sends the packets through multiple channels based on the set of data vectors that each packet contains.

In one implementation, first, the sender 102 interleaves original packet streams. Instead of sending packets as 0 0 . . . 0 1 1 . . . 1 (the numbers shown are the generation number), it sends packets as 0 1 2 . . . I−1, 0, 1, 2, . . . I−1, Hence the implementation distinguishes multiple channels through the generation number carried in the metadata of packets. The mapping from the generation number to channel number can be done by the following pseudo code.

NetworkCodec.Map(int gen){return channelID=gen % K;}

Second, each network codec maintains I inSpaces and serves them round robin for each of the servers (outgoing links).

Pre-Emptive Scheduling for Urgent Packets

In another implementation, the above round-robin scheduling is modified to allow the channels with flushing packets (i.e., the first packet of a next generation) to preempt channels without flushing packets in the scheduling. Using the example set forth in FIG. 17, the communication network 110 marks a first packet of the next generation 1704 as urgent. Hence the inSpaces with flushing packets are marked "URGENT". The pseudo codes for this (for a SlotToServe function) are set forth below.

```
NetworkCodec.SlotToServe(Link lk)
{
        if (UsePre-emptiveScheduling && there is an inSpace
marked urgent) {
                cursor   =   min{   channelID   |
inSpace[channelID].state = URGENT};
                inSpace[slot].state = NORMAL;
        }
        else
                cursor = (cursor + 1) % l;
        return cursor;
}
```

Evenly Spaced Interleaving

In another implementation, the communication network 110 prioritizes pre-emptive packets by arranging flushing packets (first packets of a next generation) such that they tend to arrive evenly in time. To do so, the sender 102 controls the timing of the interleaved generations such that the beginnings of the generations are evenly spaced over the duration of a generation.

An example of this implementation is shown below. In this example "B" indicates an evenly spaced interleaving and "A" is an example of non-evenly spaced interleaving.

introductory information, followed by explanations of the implementations.

These implementations of block 906 include flushing a buffer by following a predetermined schedule and flushing a buffer after packets of a next generation appear on every incoming edge from a higher node. These implementations decrease packet losses due to delay spread by coordinating the time boundaries to serve each generation.

The relative time for a node in the communication network 110 to serve any given generation of packets may be freely chosen on each edge. This section describes techniques to coordinate service time-shifts for each edge, thereby coordinating time boundaries to serve each generation.

In one example of this implementation, the time-shift parameter for edge e is denoted with $\tau(e)$. The interval of packet transmission at edge e is denoted with $\Delta t_e$; that is, on edge e, the k-th output packet is sent at time $t[e,k]=\tau(e)+k\Delta t_e$. Additionally, this example assumes there is a delay $d(e)$ associated with each edge. This delay $d(e)$ models the processing delay, transmission time, and propagation delay. For an edge e going from an upstream node v to a downstream node w, let tail(e) denote v and head(e) denote w. Using random linear network coding (e.g., using a random operator as part of linearly combining data at nodes of the communication network 110), the k-th output packet is a linear combination of the packets that arrived at the tail(e) before time t[e,k]. In this example the edges with three indices are indexed, with $e_{ijk}$ denoting the k-th edge on the j-th path-flow of $(s, r_i)$. One edge may be assigned to several indices, however.

Figure 19:
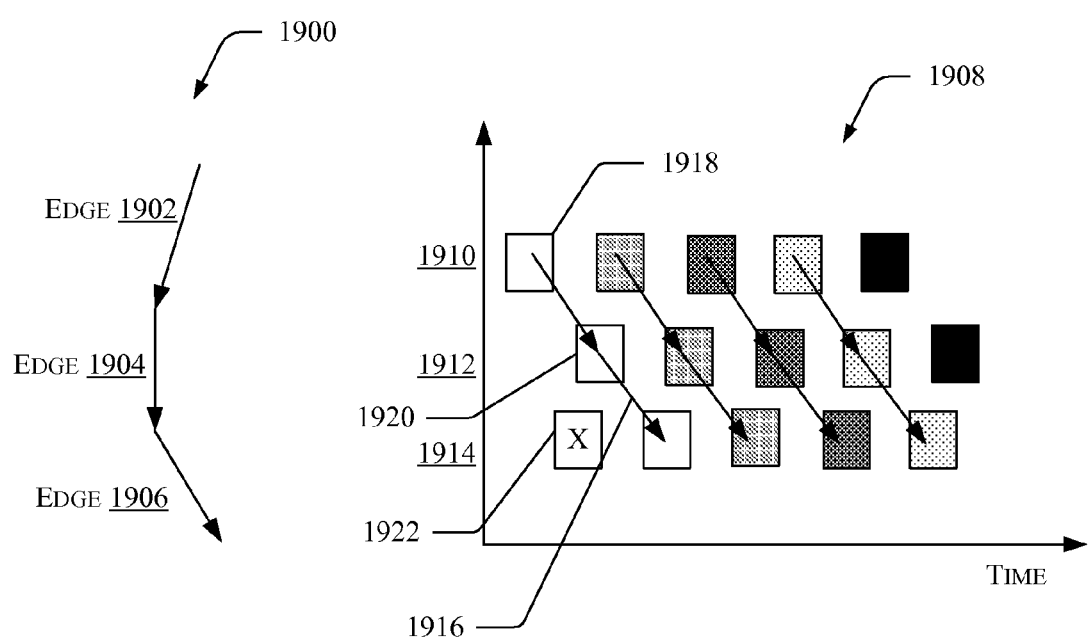
FIG. 19 illustrates an exemplary path of a communication network having three edges and a timing of packets traveling along these edges.

FIG. 19 sets forth an exemplary, graphical representation of a path 1900 having three edges, first edge 1902, second edge 1904, and third edge 1906. FIG. 19 also shows how packets may travel along this path 1900 with an edge/time graph 1908. The edge/time graph 1908 shows packets traveling on each of these edges 1902, 1904, and 1906 at first-edge packets 1910, second-edge packets 1912, and third-edge packets 1914. FIG. 19, as part of the edge/time graph 1908, shows information being woven along the path 1900, at a woven path 1916.

For example, set i=1 and j=1. At time $\tau(e_{111})$ a first packet 1918 is sent out on the first edge 1902 (also called "$e_{111}$"). At $\tau(e_{111})+d(e_{111})$ it arrives at tail($e_{112}$), if $\tau(e_{111})+d(e_{111}) \leq \tau(e_{112})$, then the information in this first packet 1918 will be able to travel within a first output packet 1920 of the second edge 1904 (also called "$e_{112}$"). This first output packet 1920 is called a first information carrier for this path-flow. At $\tau(e_{113})$ a second output packet 1922 is sent out on the third edge 1906 (also called "$e_{113}$"); if, as shown below in the edge/time graph 1908, this occurs before anything has arrived at tail($e_{113}$), then this packet is not carrying any information. In this way, given any assignment of $\tau(e)$, $\forall e \in E$, the communication network 110 may identify the sequence of first information carriers.

A: [ 0 ] [ ] [ 0 ] [ ] [ 0 ] [ ] [ 0 ] [ ] [ 2 ] [ ] [ 2 ] [ ] [ 2 ] [ ] [ 2 ] [ ] ...

B: [ 0 ] [ ] [ 0 ] [ ] [ 0 ] [ ] [ 0 ] [ ] [ 2 ] [ ] [ 2 ] [ ] [ 2 ] [ ] [ 4 ] [ ] ...

Reducing Delay Spread Via Coordinating the Transmissions

Additional implementations of blocks 906 and 1808 are set forth as part of the discussion below. To better understand these implementations, the discussion sets forth additional Along a path, there may be a bottleneck edge, which has a maximum number of packets (denoted with $l_{11}$) falling to the left of the first information 14 thread (here shown as the second output packet 1922). Therefore, this path will at least lose $l_{11}$ packets.

If this generation has P packets, the communication network 110 may weave the first information thread (here shown as the woven path 1916), such that there are P-$l_{11}$ threads for this path. In one implementation, similar operations of weaving threads may be carried out for all paths to all receivers (such as the receivers 104 and 106). In this implementation, a packet may be an information carrier for multiple paths to different receivers.

The communication network 110 may count a total number of packets lost for each of the receivers by adding up the losses over different paths. Using an optimization, the communication network 110 may minimize the packet loss (e.g., the maximum loss over all the receivers).

The model described and shown above is simplified below to aid in describing an exemplary optimization. The modeling simplifications include: first, d(e)'s are assumed to be deterministic quantities rather than random variables; second, the packet streams are replaced by a continuous fluid stream with density equal to the flow value along that path (the flow value of path ij is denoted with $x_{ij}$); and third, the path flows in a flow to one receiver are considered edge disjoint.

The communication network 110 reduces packet loss with an optimization. In one implementation, this optimization is a linear program shown below that uses the simplified model (though use of this simplified model is not necessary).

$$\min L$$
$$L \geq \sum_j l_{ij} \cdot x_{ij}, \forall i$$
$$l_{ij} \geq \xi(e_{ijk}) - \tau(e_{ijk}), \forall k$$
$$\xi(e_{ijk}) \geq \tau(e_{ijk})$$
$$\xi(e_{ij(k+1)}) \geq \xi(e_{ijk}) + d(e_{ijk})$$

The meanings of the variables are as follows: $\xi(e_{ijk})$ is a time when a first information carrier for path ij leaves $e_{ijk}$; $l_{ij}$ is a maximum loss along path ij; L is a maximum (over receiver) of the sum (over path) of losses along all paths to a receiver.

This linear program may be solved with a minimum value L found. Then, a second linear program may be used to minimize the delay. In this further implementation, the second linear program includes changing the above program to:

$$\min \xi$$
$$\xi \geq \xi(e_{ijk}), \forall ijk$$
$$L \geq \sum_j l_{ij} \cdot x_{ij}, \forall i$$
$$l_{ij} \geq \xi(e_{ijk}) - \tau(e_{ijk}), \forall k$$
$$\xi(e_{ijk}) \geq \tau(e_{ijk})$$
$$\xi(e_{ij(k+1)}) \geq \xi(e_{ijk}) + d(e_{ijk})$$

If a union of flows is acyclic (such as in the codec on edge and codec on node models shown in FIG. 15), the first linear program has a simple solution, i.e., $l_{ij}=0$. Therefore, no throughput loss is necessary. Each edge just waits for one packet from each of the incoming links involved in the union of flows and then sends the first packet out. Moreover, such a solution also minimizes an end-to-end delay. For a cyclic graph, the strategy mentioned above, which is to wait for one packet to arrive from each of the incoming links, may be problematic if deadlocks occur, or every edge involved in a loop is waiting and thus not producing packets.

To address some of the potential problems with the waiting strategy, the communication network 110 may also use heuristic algorithms in conjunction with the above waiting strategy to avoid possible deadlocks.

In this implementation of block 906, the nodes of the communication network 110 flush a buffer after packets of a next generation appear on every incoming edge from a higher node (see also block 1214). By so doing, the communication network 110 breaks possible cycles. In this implementation, nodes of the communication network 110 (and their codecs, if applicable) wait for a selected subset of incoming edges that cannot be involved in a cycle of waiting, and thus are guaranteed to have packets appearing sooner or later.

To do so, the communication network 110 associates height labels with nodes of the communication network 110. Height labels, which are elements of an ordered set such as the integers, are used by the nodes to determine which of a node's neighbors are in the upstream direction towards the sender 102 and which of its neighbors are in the downstream direction away from the sender 102. Nodes closer to the sender 102 (upstream) have higher labels. Nodes further from the sender 102 (downstream) have lower labels. The sender 102 is given a largest height label. Each node knows or may learn its neighboring node's height information, such as through local message exchanges.

The communication network 110 then has nodes wait only for one packet from each neighbor higher than itself before producing a first, outgoing packet of a generation earlier than the waited for packets from the higher nodes. If all of the node's neighbors are shorter, the node quickly produces an empty packet and sends it out. By so doing, deadlocks may be avoided.

More on Setting Height Labels

In another implementation of block 906, the communication network 110 sets nodes that are closer to the sender 102 to have relatively larger heights and vice versa. This creates a gradual potential field that enables packets to flow from the sender 102 to the receivers 104, 106, and 108.

That being said, various schemes may be used to establish approximate distance measures and height labels. For acyclic graphs, an appropriate distance measure at a node is the physical delay (excluding waiting time) along the longest path-flows from the sender 102 to the node. Adopting this distance measure for cyclic graphs is a heuristic approach. If local path-flow information is available, the measurement scheme described above may be used for this purpose.

Another way to set height labels is to measure the shortest distance (either in terms of time or hops traversed) from the sender 102 to the receiving nodes 104 and 106. The communication network 110 may measure this shortest distance more easily than measuring longest distance because every node responds to a first probing packet received and forwards it immediately to all of outgoing links and discards subsequent probing packets.

Still another way to set height labels is to use the same measurement methodologies for measuring the shortest distance above, but label the distance as the longest one received on the slowest incoming link.

Yet another way to set height labels is to acquire information about a decomposition of the communication network 110 into strongly connected components. The nodes in the communication network 110 may be partitioned into disjoint groups according to an equivalence relation ~: v~w if and only if there exist a directed path from v to w and a directed path from w to v.

The subgraph induced by each equivalence group is called a strongly connected component (SCC). Each subgraph may be viewed in two levels. First, it may be viewed at a coarse level where each SCC is contracted into one summary node. The resulting coarse-level subgraph is acyclic. Second, it may be viewed at a finer level. Here the communication network 110 zooms into each summary node and studies the connectivity information inside each SCC. The SCC is relevant here because the edges across SCCs are not involved in cycles whereas the edges inside each SCC are. With SCC information identified, each node may be identified as an SCC ID that follows by running a topological sort on a coarse-level abstraction graph. This SCC ID is then used as a height label.

In one implementation of this scheme, the computation of SCC IDs are facilitated by existing distributed algorithms for finding SCCs.

A Computer System

Figure 20:
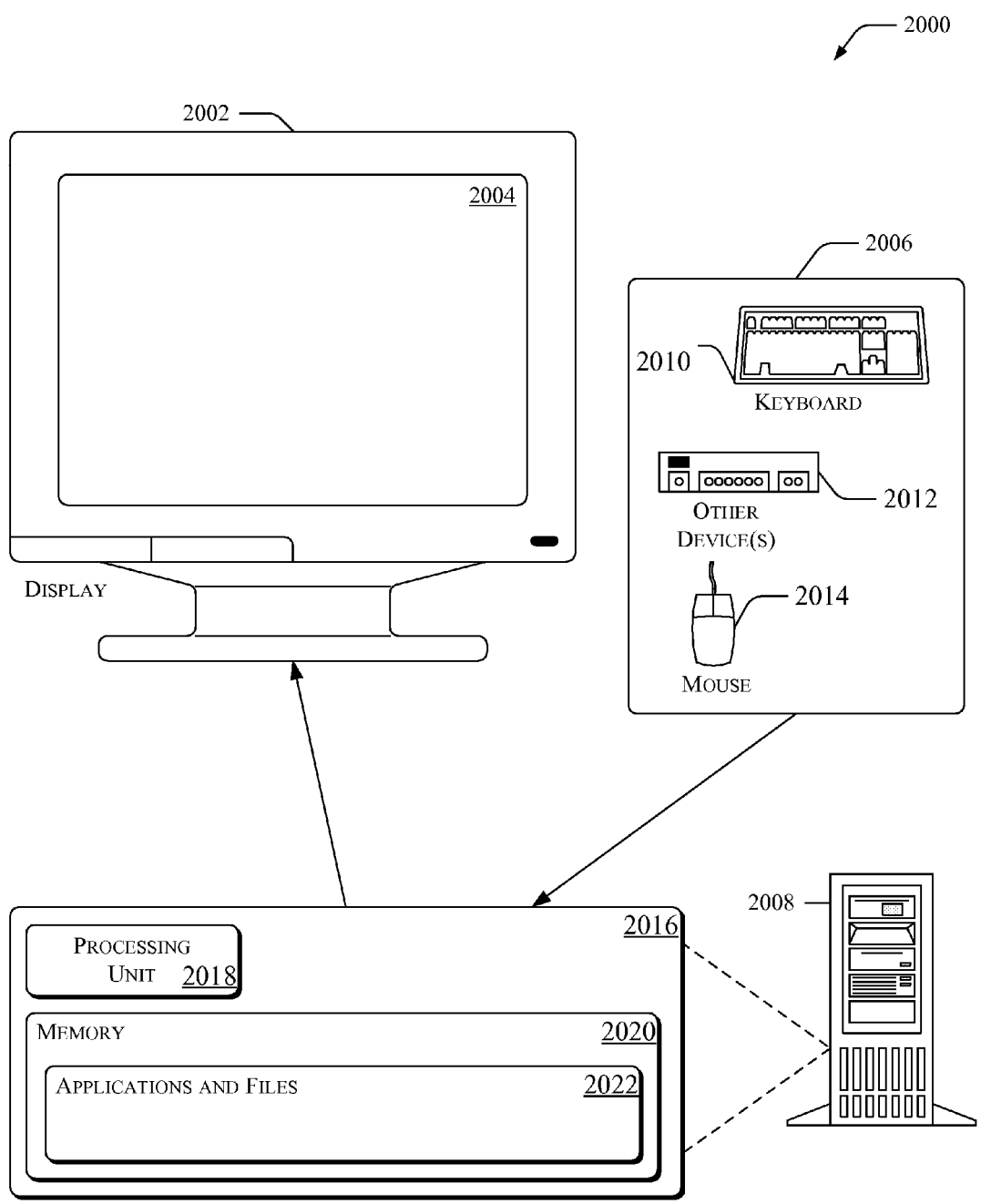
FIG. 20 is a block diagram of a computer system that is capable of acting as a sending, intermediate, or receiving node of a communication network that is capable of broadcasting data in packets using network coding.

FIG. 20 shows an exemplary computer system that may be used to implement the processes described herein. This exemplary computer system may perform the actions of a communication network (such as the communication network 110) and its parts, including a sending node (such as the sender 102), intermediate nodes (such as the nodes 202, 204, 206, and 208), and receiving nodes (such as the receivers 104 and 106).

The system 2000 includes a display 2002 having a screen 2004, a user-input device 2006, and a computer 2008. The user-input device 2006 may include any device allowing a computer to receive input from a user, such as a keyboard 2010, other devices 2012, and a mouse 2014. The other devices 2012 may include a touch screen, a voice-activated input device, a track ball, and the like.

The computer 2008 includes components shown in block 2016, such as a processing unit 2018 to execute applications and a memory 2020 containing various applications and files 2022. The memory 2020 includes computer-readable media. The computer-readable media may be any available media that may be accessed by the computer 2008. By way of example, and not limitation, computer-readable media includes volatile and nonvolatile, removable and non-removable media implemented in any method or technology for storage of information such as computer-readable instructions, data structures, program modules, and other data. Computer storage media includes, but is not limited to, RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which may be used to store the desired information and which may be accessed by the computer 2008. Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media, such as acoustic, RF, infrared, or other wireless media. Computer-readable media may also include any combinations of any of the above.

CONCLUSION

The above-described system and method enables early decoding and efficient broadcast of data across a network. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, comprising:
    determining a sub-network in an asynchronous communication network between a single sender and multiple receivers, wherein the sub-network is defined by a union of flows, and the union of flows is determined by restricting a magnitude of each flow of the union of flows between the sender and the multiple receivers to a same value; and
    communicating, in the asynchronous communication network, from the single sender to the multiple receivers over edges in the sub-network,
    wherein the determining comprises reducing transmission rates on edges in the asynchronous communication network that lie between the single sender and the multiple receivers that have a low rate of transmission of innovative information.

2. The method of claim 1, wherein the reducing also comprises back-tracking from the multiple receivers to the single sender.

3. The method of claim 1, wherein determining the sub-network comprises eliminating non-contributing edges in the asynchronous communication network.

4. The method of claim 3, wherein the reducing comprises back-tracking contributing nodes from the receivers.

5. The method of claim 1, wherein the sub-network is defined by a union of flows, and the union of flows is determined by using an optimization comprising a linear program, assuming a pricing function regarding a usage of each edge is linear.

6. The method of claim 1, wherein determining the sub-network is performed by a union of flows determined by:
    running a distributed max-flow algorithm for every receiver;
    adding up communication costs across the receivers; and
    reducing the communications costs by computing all flows at a same time;
    wherein each message exchange may convey a vector of elementary messages, one for finding a max-flow of each receiver.

7. The method of claim 1, wherein determining the sub-network comprises:
    flooding the asynchronous communication network for a first few generations of packets;
    collecting sufficient amounts of data to obtain statistics, wherein the statistics obtained including finding what proportions of packets flowing on each edge are innovative; and
    restricting the flooding of the asynchronous communication network into a sub-network, wherein the restricting comprises:
    eliminating non-contributing edges in the asynchronous communication network; and
    back-tracking contributing nodes from the receivers.

8. A method, comprising:
determining a sub-network in an asynchronous communication network between a single sender and multiple receivers, wherein determining the sub-network comprises:
flooding the asynchronous communication network for a first few generations of packets;
collecting sufficient amounts of data to obtain statistics, wherein the statistics obtained including finding what proportions of packets flowing on each edge are innovative; and
restricting the flooding of the asynchronous communication network into a sub-network, wherein the restricting comprises:
eliminating non-contributing edges in the asynchronous communication network; and
back-tracking contributing nodes from the receivers; and
communicating, in the asynchronous communication network, from the single sender to the multiple receivers over edges in the sub-network,
wherein the determining includes restricting a magnitude of each flow in the sub-network between the sender and each of the multiple receivers to a value that is less than or equal to a broadcast capacity.

9. The method of claim 8, wherein determining the sub-network comprises back-tracking from the multiple receivers to the single sender.

10. The method of claim 8, wherein the sub-network is defined by a union of flows, and the union of flows is determined by restricting a magnitude of each flow of the union of flows between the sender and the multiple receivers to a same value.

11. The method of claim 8, wherein the sub-network is defined by a union of flows, and the union of flows is determined by using an optimization comprising a linear program, assuming a pricing function regarding a usage of each edge is linear.

12. The method of claim 8, wherein determining the sub-network is performed by a union of flows determined by:
finding two or more flows, using a distributed algorithm, each from the sender to a receiver;
synchronizing the distributed algorithm for finding two or more flows; and
exchanging combined messages between neighboring nodes.

13. The method, comprising:
determining a sub-network in an asynchronous communication network between a single sender and multiple receivers, wherein determining the sub-network is performed by a union of flows determined by:
running a distributed max-flow algorithm for every receiver;
adding communication costs across the receivers; and
reducing the communications costs by computing all flows at a same time;
wherein each message exchange may convey a vector of elementary messages, one for finding the max-flow of each receiver; and
communicating, in the asynchronous communication network, from the single sender to the multiple receivers over edges in the sub-network,
wherein the determining includes use of a distributed process for finding two or more flows between the sender and the multiple receivers, the distributed process including exchange of messages for each of the flows and combination of the messages for one of the flows with the messages for another of the flows.

14. The method of claim 13, wherein the sub-network is defined by a union of flows, and the union of flows is determined by restricting a magnitude of each flow of the union of flows between the sender and the multiple receivers to a same value.

15. The method of claim 13, wherein the sub-network is defined by a union of flows, and the union of flows is determined by using an optimization comprising a linear program, assuming a pricing function regarding a usage of each edge is linear.

16. The method of claim 13, wherein determining the sub-network is performed by a union of flows determined by:
finding two or more flows, using a distributed algorithm, each from the sender to a receiver;
synchronizing the distributed algorithm for finding two or more flows; and
exchanging combined messages between neighboring nodes.

17. The method of claim 13, wherein determining the sub-network comprises:
flooding the asynchronous communication network for a first few generations of packets;
collecting sufficient amounts of data to obtain statistics, wherein the statistics obtained including finding what proportions of packets flowing on each edge are innovative; and
restricting the flooding of the asynchronous communication network into a sub-network, wherein the restricting comprises:
eliminating non-contributing edges in the asynchronous communication network; and
back-tracking contributing nodes from the receivers.

* * * * *

UNITED STATES PATENT AND TRADEMARK OFFICE
CERTIFICATE OF CORRECTION

| | | |
|---|---|---|
| PATENT NO. | : 7,760,728 B2 | Page 1 of 1 |
| APPLICATION NO. | : 12/185720 | |
| DATED | : July 20, 2010 | |
| INVENTOR(S) | : Philip A. Chou et al. | |

It is certified that error appears in the above-identified patent and that said Letters Patent is hereby corrected as shown below:

In column 38, line 3, in Claim 13, after "adding" insert -- up --.

Signed and Sealed this
Fifteenth Day of March, 2011

David J. Kappos
*Director of the United States Patent and Trademark Office*